US009311811B1

(12) United States Patent
Szewczyk et al.

(10) Patent No.: US 9,311,811 B1
(45) Date of Patent: Apr. 12, 2016

(54) ALARM PROFILE FOR A FABRIC NETWORK

(71) Applicant: Google Inc., Mountain View, CA (US)

(72) Inventors: Robert Szewczyk, Sunnyvale, CA (US); Jay D. Logue, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/588,104

(22) Filed: Dec. 31, 2014

Related U.S. Application Data

(60) Provisional application No. 62/061,593, filed on Oct. 8, 2014.

(51) Int. Cl.
   *G08B 29/02*   (2006.01)

(52) U.S. Cl.
   CPC .................... *G08B 29/02* (2013.01)

(58) Field of Classification Search
   CPC .... G08B 29/02; H04L 12/1895; H04L 67/12; H04L 69/08; H04W 4/22
   USPC ......................... 340/506; 455/404.1
   See application file for complete search history.

(56) References Cited

U.S. PATENT DOCUMENTS

| | | | | | |
|---|---|---|---|---|---|
| 4,551,842 | A | * | 11/1985 | Segarra ......................... | 714/704 |
| 4,956,875 | A | * | 9/1990 | Bernard et al. ............... | 455/13.1 |
| 5,777,549 | A | * | 7/1998 | Arrowsmith .......... | H04L 41/042 340/506 |
| 2002/0010688 | A1 | * | 1/2002 | Shah et al. .................... | 705/405 |
| 2004/0049590 | A1 | | 3/2004 | Collier et al. | |
| 2005/0147069 | A1 | * | 7/2005 | Rink et al. .................... | 370/338 |
| 2005/0260989 | A1 | | 11/2005 | Pourtier et al. | |
| 2006/0092890 | A1 | | 5/2006 | Gupta et al. | |
| 2007/0061018 | A1 | | 3/2007 | Callaghan et al. | |
| 2007/0218875 | A1 | | 9/2007 | Calhoun et al. | |
| 2010/0114853 | A1 | * | 5/2010 | Fisher et al. .................. | 707/705 |
| 2010/0138507 | A1 | * | 6/2010 | Sun et al. ...................... | 709/206 |
| 2011/0013630 | A1 | * | 1/2011 | Nanda et al. .................. | 370/390 |
| 2011/0133924 | A1 | * | 6/2011 | Thubert et al. ................ | 340/506 |
| 2011/0153766 | A1 | * | 6/2011 | Ramchandani ............... | 709/207 |
| 2012/0184907 | A1 | * | 7/2012 | Smith et al. ................... | 604/152 |
| 2012/0246345 | A1 | | 9/2012 | Contreras et al. | |
| 2013/0136117 | A1 | | 5/2013 | Schrum et al. | |
| 2013/0311140 | A1 | * | 11/2013 | Schechter ..................... | 702/188 |
| 2013/0322281 | A1 | | 12/2013 | Ludlow et al. | |
| 2014/0120861 | A1 | * | 5/2014 | Kwak et al. ............... | 455/404.1 |
| 2014/0169214 | A1 | | 6/2014 | Nakajima | |
| 2014/0280520 | A1 | | 9/2014 | Baier et al. | |
| 2014/0359101 | A1 | | 12/2014 | Dawes et al. | |
| 2015/0006633 | A1 | | 1/2015 | Vandwalle et al. | |

(Continued)

OTHER PUBLICATIONS

Phillips et al., Internet Engineering Task Force. Tags for Identifying Languages. BCP 47. Sep. 2009. http://tools.ietf.org/html/bcp47.

(Continued)

*Primary Examiner* — Fekadeselassie Girma
*Assistant Examiner* — Stephen Burgdorf

(57) ABSTRACT

Methods and systems for transferring alarm information by sending an alarm message containing information about an alarm. The alarm message includes an alarm counter indicator that indicates whether an alarm status has changed from a previous alarm message. The alarm message also includes one or more indications of alarm conditions indicating an alarm state or an alarm source. Furthermore, the alarm message includes an alarm length that indicates a number of alarm conditions included in the alarm message.

18 Claims, 24 Drawing Sheets

(56) References Cited

U.S. PATENT DOCUMENTS

2015/0023336 A1 1/2015 Ilsar et al.
2015/0334545 A1* 11/2015 Maier .................... H04W 4/22
                                                                                               455/404.2

OTHER PUBLICATIONS

J. Klensin, Internationalized Domain Names in Applications (IDNA): Protocol, Aug. 2010. http://tools.ietf.org/html/rfc5891.

USB Implementers' Forum. Universal Serial Bus (USB): Device Class Definition for Human Interface Devices (HID). Version 1.11. Jun. 27, 2001; http://www.usb.org/developers/hidpage/HID1_11.pdf.

Language Tags in HTML and XML, Sep. 10, 2009, http://www.w3.org/International/articles/language-tags/Overview.en.php.

Ping, Oracle Manual Pages Section 1M: System Administration Commands, pp. 1706-1710, 2013 http://www.w3.org/International/articles/language-tags/Overview.en.php.

Markus Mathes; "Time Constrained Web Services for Industrial Automation," Dissertation from Philipps Universitat—Marburg; pp. 1-201, Jul. 9, 2009.

International Search Report and Written Opinion for PCT Application No. PCT/US2015/054287 dated Jan. 22, 2016; 14 pgs.

* cited by examiner

ALARM PROFILE FOR A FABRIC NETWORK

CROSS-REFERENCE TO RELATED APPLICATIONS

This application claims the benefit of U.S. Provisional Application Ser. No. 62/061,593, filed Oct. 8, 2014, entitled "FABRIC NETWORK," which is incorporated by reference herein in its entirety.

BACKGROUND

This disclosure relates to data communication profiles for systems, devices, methods, and related computer program products for smart buildings, such as a smart home. This disclosure relates to a fabric network that couples electronic devices using one or more network types and an alarm profile configured to enable the one or more electronic devices to propagate alarms throughout the network.

Some homes today are equipped with smart home networks to provide automated control of devices, appliances and systems, such as heating, ventilation, and air conditioning ("HVAC") systems, lighting systems, alarm systems, and home theater and entertainment systems. Furthermore, some of these smart devices may include sensors that are used to alarm on various conditions. However, since the devices may of different types with different capabilities, it may be difficult to propagate alarms through devices on the network.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods a fabric network that includes one or more logical networks that enables devices connected to the fabric to communicate with each other using a list of protocols and/or profiles known to the devices. The communications between the devices may follow a typical message format that enables the devices to understand communications between the devices regardless of which logical networks the communicating devices are connected to in the fabric. Within the message format, a payload of data may be included for the receiving device to store and/or process. The format and the contents of the payload may vary according to a header (e.g., profile tag) within the payload that indicates a specific profile (including one or more protocols) and/or a type of message that is being sent according to the profile with the message header and/or payload causing a specific response in the receiving device.

According to some embodiments, two or more devices in a fabric may communicate using various profiles. For example, in certain embodiments, a data management profile, a network provisioning profile, or a core profile (including status reporting protocols) that are available to devices connected to the fabric. Using the profiles, devices may send or request information to or from other devices in the fabric in an understood message format. Using an alarm profile, an alarm that originates at one smart device may be propagated to various devices within the network.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
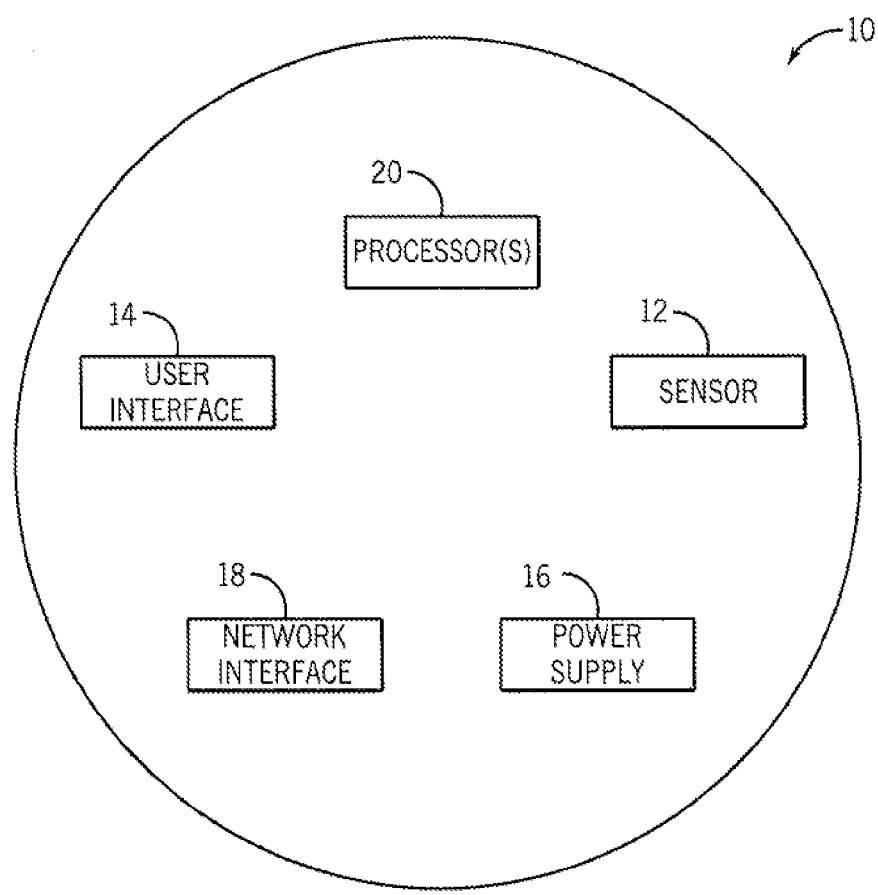
FIG. 1 is a block diagram of an electronic device having that may be interconnected with other devices using a fabric network, in accordance with an embodiment.

One or more specific embodiments of the present disclosure will be described below. These described embodiments are only examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to an efficient fabric network that may be used by devices and/or services communicating with each other in a home environment. Generally, consumers living in homes may find it useful to coordinate the operations of various devices within their home such that of their devices are operated efficiently. For example, a thermostat device may be used to detect a temperature of a home and coordinate the activity of other devices (e.g., lights) based on the detected temperature. In this example, the thermostat device may detect a temperature that may indicate that the temperature outside the home corresponds to daylight hours. The thermostat device may then convey to the light device that there may be daylight available to the home and that thus the light should turn off.

In addition to operating these devices efficiently, consumers generally prefer to use user-friendly devices that involve a minimum amount of set up or initialization. That is, consumers may generally prefer to purchase devices that are fully operational after performing a few number initialization steps that may be performed by almost any individual regardless of age or technical expertise.

With the foregoing in mind, to enable to effectively communicate data between each other within the home environment, the devices may use a fabric network that includes one or more logical networks to manage communication between the devices. That is, the efficient fabric network may enable numerous devices within a home to communicate with each other using one or more logical networks. The communication network may support Internet Protocol version 6 (IPv6) communication such that each connected device may have a unique local address (LA). Moreover, to enable each device to integrate with a home, it may be useful for each device to communicate within the network using low amounts of power. That is, by enabling devices to communicate using low power, the devices may be placed anywhere in a home without being coupled to a continuous power source (e.g., battery-powered).

I. Fabric Introduction

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The user-interface component 14 may also include one or more user-input components that may receive information from the user. The received input may be used to determine a setting. In certain embodiments, the user-input components may include a mechanical or virtual component that responds to the user's motion. For example, the user can mechanically move a sliding component (e.g., along a vertical or horizontal track) or rotate a rotatable ring (e.g., along a circular track), the user's motion along a touchpad may be detected, or motions/gestures may be detected using a contactless gesture detection sensor (e.g., infrared sensor or camera). Such motions may correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-input component may be associated with a magnitude of a setting adjustment, such that a user may dramatically alter a setting with a large movement or finely tune a setting with s small movement.

The user-interface components 14 may also include one or more buttons (e.g., up and down buttons), a keypad, a number pad, a switch, a microphone, and/or a camera (e.g., to detect gestures). In one embodiment, the user-input component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-input component 14 may include a camera that may detect gestures (e.g., to indicate that a power or alarm state of a device is to be changed). In some instances, the device 10 may have one primary input component, which may be used to set various types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available. In certain embodiments, the power supply component 16 may include intermittent or reduced power connections that may be less than that provided via an AC plug in the home. In certain embodiments, devices with batteries and/or intermittent or reduced power may be operated as "sleepy devices" that alternate between an online/awake state and an offline/sleep state to reduce power consumption.

The network interface 18 may include one or more components that enable the device 10 to communicate between devices using one or more logical networks within the fabric network. In one embodiment, the network interface 18 may communicate using an efficient network layer as part of its Open Systems Interconnection (OSI) model. In certain embodiments, one component of the network interface 18 may communicate with one logical network (e.g., WiFi) and another component of the network interface may communicate with another logical network (e.g., 802.15.4). In other words, the network interface 18 may enable the device 10 to wirelessly communicate via multiple IPv6 networks. As such, the network interface 18 may include a wireless card, Ethernet port, and/or other suitable transceiver connections.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, other types of hardware/firmware/software processing platforms, and/or some combination thereof. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In some instances, the processor 20 may predict desirable settings and/or implement those settings. For example, based on presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device using one or more common profiles between the devices. For example, a first device can detect that a user has pulled into a garage (e.g., by detecting motion in the garage, detecting a change in light in the garage or detecting opening of the garage door). The first device can transmit this information to a second device via the fabric network, such that the second device can, e.g., adjust a home temperature setting, a light setting, a music setting, and/or a security-alarm setting. As another example, a first device can detect a user approaching a front door (e.g., by detecting motion or sudden light pattern changes). The first device may cause a general audio or visual signal to be presented (e.g., such as sounding of a doorbell) or cause a location-specific audio or visual signal to be presented (e.g., to announce the visitor's presence within a room that a user is occupying).

Figure 2:
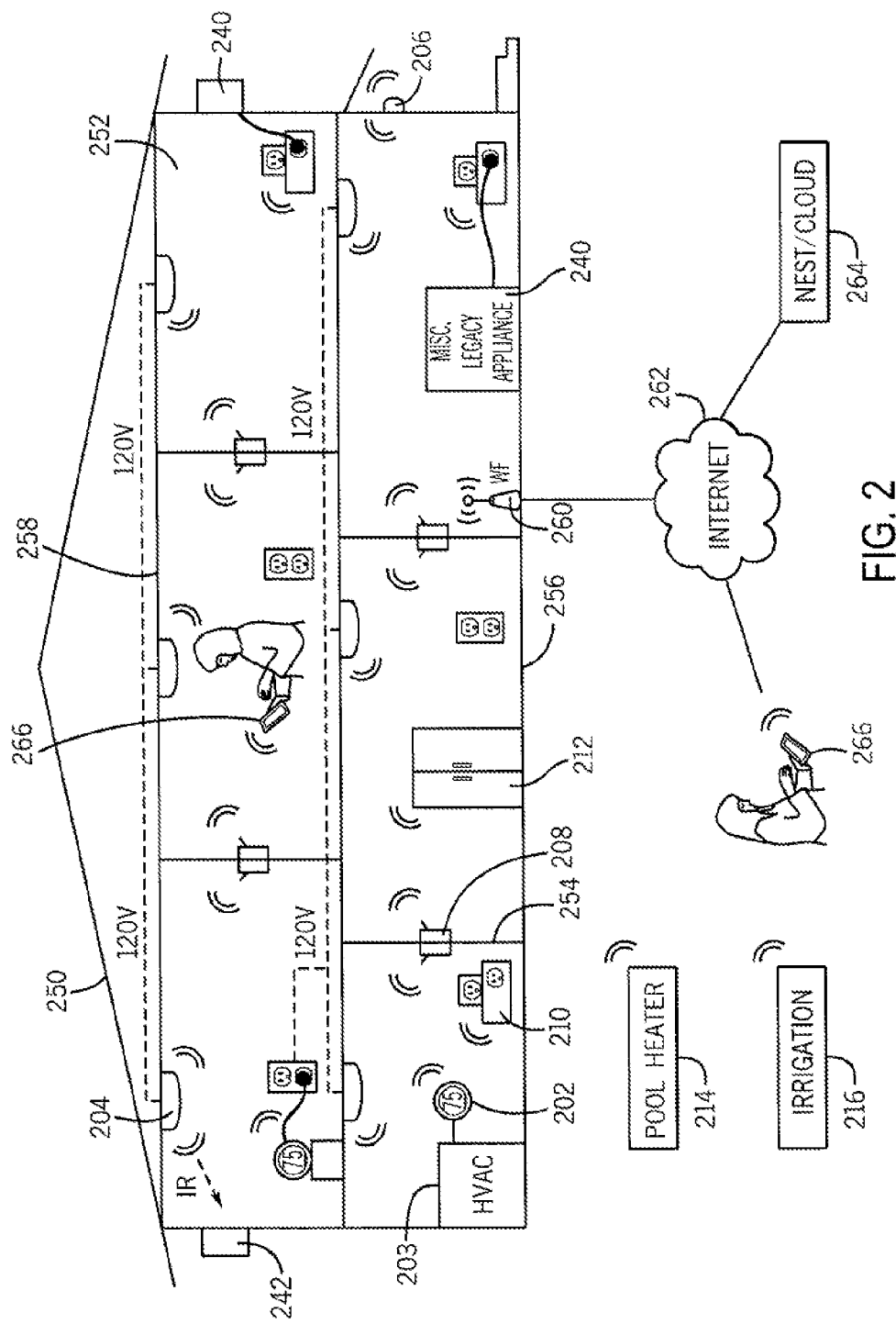
FIG. 2 illustrates a block diagram of a home environment in which the general device of FIG. 1 may communicate with other devices via the fabric network, in accordance with an embodiment.
Figure 3:
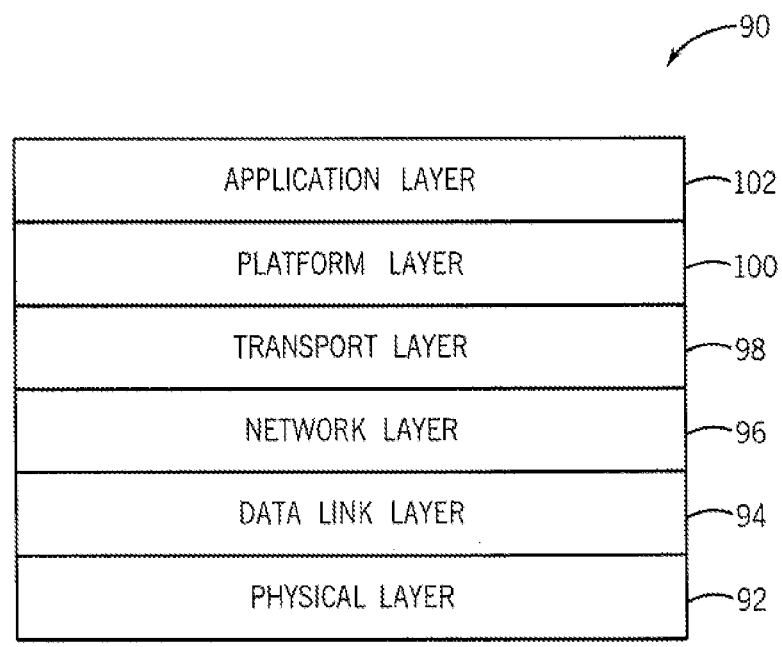
FIG. 3 illustrates a block diagram of an Open Systems Interconnection (OSI) model that characterizes a communication system for the home environment of FIG. 2, in accordance with an embodiment.

With the foregoing in mind, FIG. 2 illustrates a block diagram of a home environment 30 in which the device 10 of FIG. 1 may communicate with other devices via the fabric network. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes multiple rooms 38, separated at least partly from each other via walls 40. The walls 40 can include interior walls or exterior walls. Each room 38 can further include a floor 42 and a ceiling 44. Devices can be mounted on, integrated with and/or supported by the wall 40, the floor 42, or the ceiling 44.

The home environment 30 may include multiple devices, including intelligent, multi-sensing, network-connected devices that may integrate seamlessly with each other and/or with cloud-based server systems to provide any of a variety of useful home objectives. One, more or each of the devices illustrated in the home environment 30 may include one or more sensors 12, a user interface 14, a power supply 16, a network interface 18, a processor 20 and the like.

Example devices 10 may include a network-connected thermostat 46 that may detect ambient climate characteristics (e.g., temperature and/or humidity) and control a heating, ventilation and air-conditioning (HVAC) system 48. Another example device 10 may include a hazard detection unit 50 that can detect the presence of a hazardous substance and/or a hazardous condition in the home environment 30 (e.g., smoke, fire, or carbon monoxide). Additionally, entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that any of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via a fabric network discussed below. In one embodiment, fabric may enable the devices 10 to communicate with each other via one or more logical networks. As such, certain devices may serve as wireless repeaters and/or may function as bridges between devices, services, and/or logical networks in the home environment that may not be directly connected (i.e., one hop) to each other.

In one embodiment, a wireless router 60 may further communicate with the devices 10 in the home environment 30 via one or more logical networks (e.g., WiFi). The wireless router 60 may then communicate with the Internet 62 or other network such that each device 10 may communicate with a remote service or a cloud-computing system 64 through the Internet 62. The cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the cloud-computing system 64 or devices in the home environment 30 to other devices in the fabric (e.g., when available, when purchased, when requested, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current setpoint temperature for a device and adjust it using a computer that may be connected to the Internet 62. In this example, the thermostat 46 may receive the current setpoint temperature view request via the fabric network via one or more underlying logical networks.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infra-red (IR) controlled wall air conditioners or other IR-controlled devices, which can be controlled by IR signals provided by the hazard detection units 50 or the light switches 54.

Figure 4:
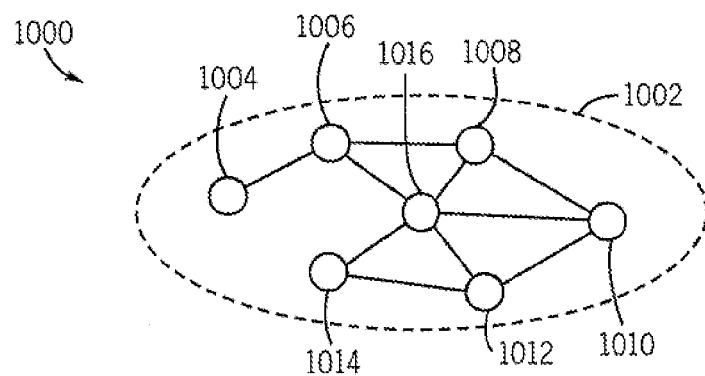
FIG. 4 illustrates the fabric network having a single logical network topology, in accordance with an embodiment.

As mentioned above, each of the example devices 10 described above may form a portion of a fabric network. Generally, the fabric network may be part of an Open Systems Interconnection (OSI) model 90 as depicted in FIG. 4. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also provide a security protocol that may maintain the integrity of the data being transferred. The efficient network layer discussed above corresponds to the network layer 96. In certain embodiments, the network layer 96 may be completely independent of the platform layer 100 and include any suitable IPv6 network type (e.g., WiFi, Ethernet, HomePlug, 802.15.4, etc).

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP).

The platform layer 100 includes the fabric network and establishes connections between devices according to the protocol specified within the transport layer 98 and may be agnostic of the network type used in the network layer 96. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

II. Fabric Device Interconnection

Figure 5:
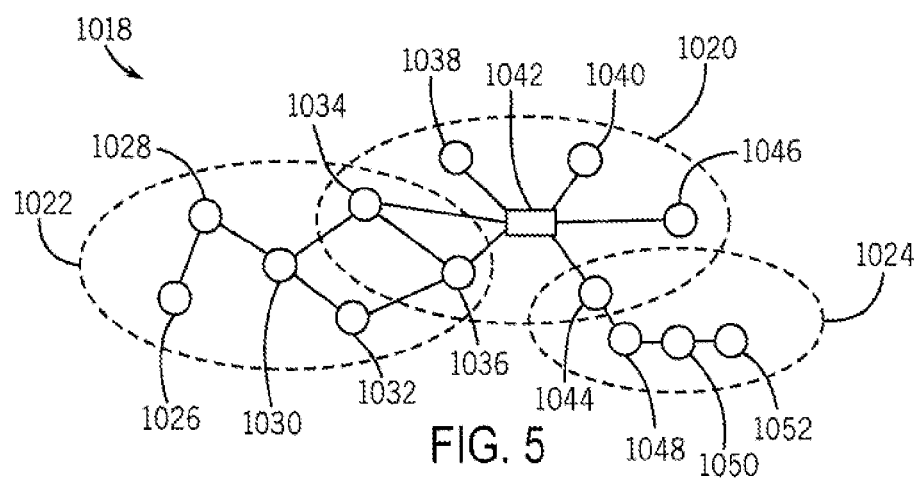
FIG. 5 illustrates the fabric network having a star network topology, in accordance with an embodiment.
Figure 6:
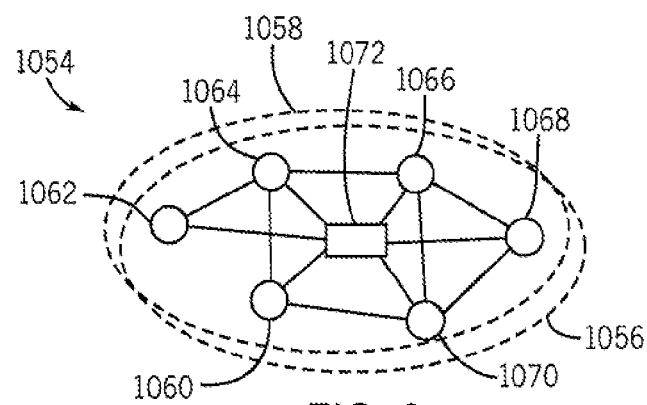
FIG. 6 illustrates the fabric network having an overlapping networks topology, in accordance with an embodiment.

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee®, ISA100.11a, WirelessHART, MiWi™, power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage. FIGS. 4-6 illustrate three embodiments that may be used to connect electrical devices via one or more sub-networks in the fabric.

A. Single Network Topology

FIG. 4 illustrates an embodiment of the fabric 1000 having a single network topology. As illustrated, the fabric 1000 includes a single logical network 1002. The network 1002 could include Ethernet, WiFi, 802.15.4, power-line networks, and/or other suitable network types in the IPv6 protocols. In fact, in some embodiments where the network 1002 includes a WiFi or Ethernet network, the network 1002 may span multiple WiFi and/or Ethernet segments that are bridged at a link layer.

The network 1002 includes one or more nodes 1004, 1006, 1008, 1010, 1012, 1014, and 1016, referred to collectively as 1004-1016. Although the illustrated network 1002 includes seven nodes, certain embodiments of the network 1002 may include one or more nodes interconnected using the network 1002. Moreover, if the network 1002 is a WiFi network, each of the nodes 1004-1016 may be interconnected using the node 1016 (e.g., WiFi router) and/or paired with other nodes using WiFi Direct (i.e., WiFi P2P).

B. Star Network Topology

FIG. 5 illustrates an alternative embodiment of fabric 1000 as a fabric 1018 having a star network topology. The fabric 1018 includes a hub network 1020 that joins together two periphery networks 1022 and 1024. The hub network 1020 may include a home network, such as WiFi/Ethernet network or power line network. The periphery networks 1022 and 1024 may additional network connection types different of different types than the hub network 1020. For example, in some embodiments, the hub network 1020 may be a WiFi/Ethernet network, the periphery network 1022 may include an 802.15.4 network, and the periphery network 1024 may include a power line network, a ZigBee® network, a ISA100.11a network, a WirelessHART, network, or a MiWi™ network. Moreover, although the illustrated embodiment of the fabric 1018 includes three networks, certain embodiments of the fabric 1018 may include any number of networks, such as 2, 3, 4, 5, or more networks. In fact, some embodiments of the fabric 1018 include multiple periphery networks of the same type.

Although the illustrated fabric 1018 includes fourteen nodes, each referred to individually by reference numbers 1024-1052, respectively, it should be understood that the fabric 1018 may include any number of nodes. Communication within each network 1020, 1022, or 1024, may occur directly between devices and/or through an access point, such as node 1042 in a WiFi/Ethernet network. Communications between periphery network 1022 and 1024 passes through the hub network 1020 using inter-network routing nodes. For example, in the illustrated embodiment, nodes 1034 and 1036 are be connected to the periphery network 1022 using a first network connection type (e.g., 802.15.4) and to the hub network 1020 using a second network connection type (e.g., WiFi) while the node 1044 is connected to the hub network 1020 using the second network connection type and to the periphery network 1024 using a third network connection type (e.g., power line). For example, a message sent from node 1026 to node 1052 may pass through nodes 1028, 1030, 1032, 1036, 1042, 1044, 1048, and 1050 in transit to node 1052.

C. Overlapping Networks Topology

FIG. 6 illustrates an alternative embodiment of the fabric 1000 as a fabric 1054 having an overlapping networks topology. The fabric 1054 includes networks 1056 and 1058. As illustrated, each of the nodes 1062, 1064, 1066, 1068, 1070, and 1072 may be connected to each of the networks. In other embodiments, the node 1072 may include an access point for an Ethernet/WiFi network rather than an end point and may not be present on either the network 1056 or network 1058, whichever is not the Ethernet/WiFi network. Accordingly, a communication from node 1062 to node 1068 may be passed through network 1056, network 1058, or some combination thereof. In the illustrated embodiment, each node can communicate with any other node via any network using any network desired. Accordingly, unlike the star network topology of FIG. 5, the overlapping networks topology may communicate directly between nodes via any network without using inter-network routing.

D. Fabric Network Connection to Services

Figure 7:
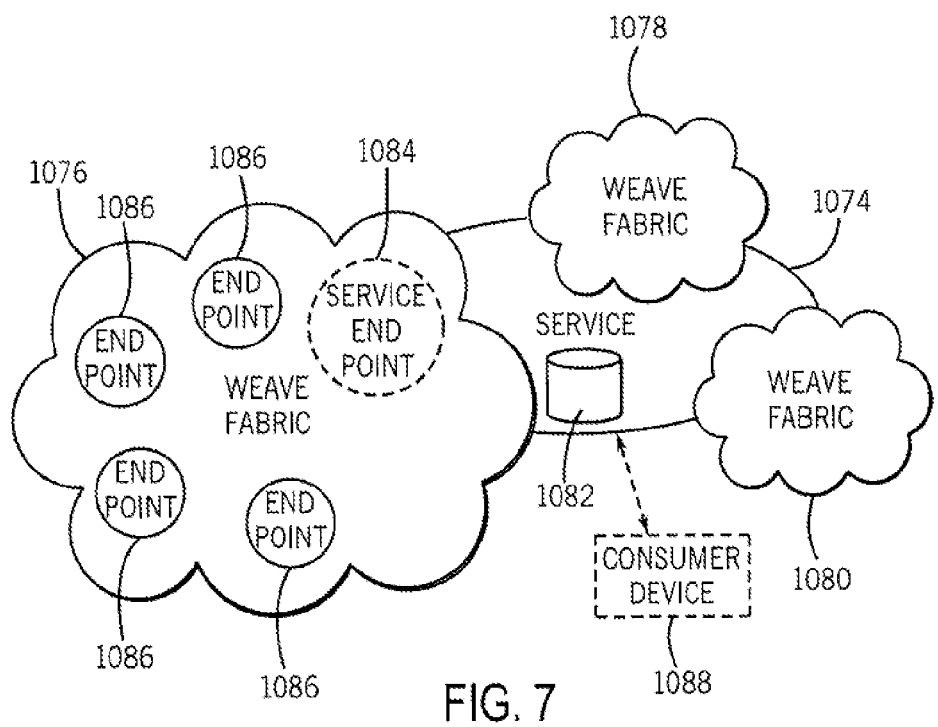
FIG. 7 illustrates a service communicating with one or more fabric networks, in accordance with an embodiment.

In addition to communications between devices within the home, a fabric (e.g., fabric 1000) may include services that may be located physically near other devices in the fabric or physically remote from such devices. The fabric connects to these services through one or more service end points. FIG. 7 illustrates an embodiment of a service 1074 communicating with fabrics 1076, 1078, and 1080. The service 1074 may include various services that may be used by devices in fabrics 1076, 1078, and/or 1080. For example, in some embodiments, the service 1074 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 1074 may include a server 1082 (e.g., web server) that stores/accesses relevant data and passes the information through a service end point 1084 to one or more end points 1086 in a fabric, such as fabric 1076. Although the illustrated embodiment only includes three fabrics with a single server 1082, it should be appreciated that the service 1074 may connect to any number of fabrics and may include servers in addition to the server 1082 and/or connections to additional services.

In certain embodiments, the service 1074 may also connect to a consumer device 1088, such as a phone, tablet, and/or computer. The consumer device 1088 may be used to connect to the service 1074 via a fabric, such as fabric 1076, an Internet connection, and/or some other suitable connection method. The consumer device 1088 may be used to access data from one or more end points (e.g., electronic devices) in a fabric either directly through the fabric or via the service 1074. In other words, using the service 1074, the consumer device 1088 may be used to access/manage devices in a fabric remotely from the fabric.

E. Communication Between Devices in a Fabric

Figure 8:
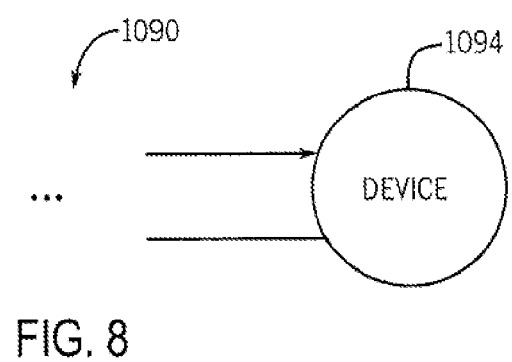
FIG. 8 illustrates two devices in a fabric network in communicative connection, in accordance with an embodiment.

As discussed above, each electronic device or node may communicate with any other node in the fabric, either directly or indirectly depending upon fabric topology and network connection types. Additionally, some devices (e.g., remote devices) may communicate through a service to communicate with other devices in the fabric. FIG. 8 illustrates an embodiment of a communication 1090 between two devices 1092 and 1094. The communication 1090 may span one or more networks either directly or indirectly through additional devices and/or services, as described above. Additionally, the communication 1090 may occur over an appropriate communication protocol, such as IPv6, using one or more transport protocols. For example, in some embodiments the communication 1090 may include using the transmission control protocol (TCP) and/or the user datagram protocol (UDP). In some embodiments, the device 1092 may transmit a first signal 1096 to the device 1094 using a connectionless protocol (e.g., UDP). In certain embodiments, the device 1092 may communicate with the device 1094 using a connection-oriented protocol (e.g., TCP). Although the illustrated communication 1090 is depicted as a bi-directional connection, in some embodiments, the communication 1090 may be a uni-directional broadcast.

i. Unique Local Address

As discussed above, data transmitted within a fabric received by a node may be redirected or passed through the node to another node depending on the desired target for the communication. In some embodiments, the transmission of the data may be intended to be broadcast to all devices. In such embodiments, the data may be retransmitted without further processing to determine whether the data should be passed along to another node. However, some data may be directed to a specific endpoint. To enable addressed messages to be transmitted to desired endpoints, nodes may be assigned identification information.

Each node may be assigned a set of link-local addresses (LLA), one assigned to each network interface. These LLAs may be used to communicate with other nodes on the same network. Additionally, the LLAs may be used for various communication procedures, such as IPv6 Neighbor Discovery Protocol. In addition to LLAs, each node is assigned a unique local address (ULA).

Figure 9:
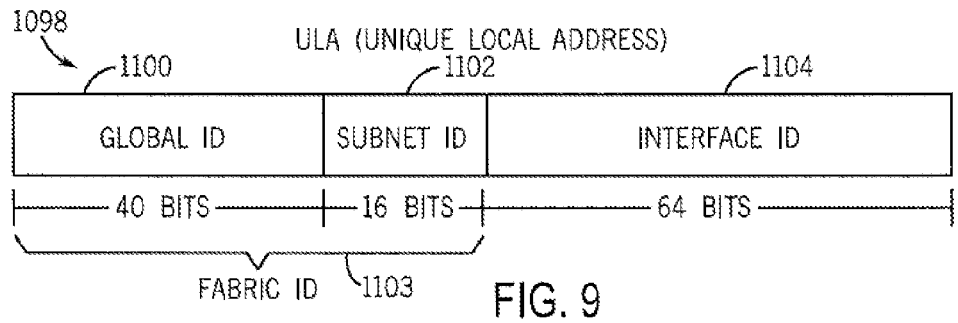
FIG. 9 illustrates a unique local address format (ULA) that may be used to address devices in a fabric network, in accordance with an embodiment.

FIG. 9 illustrates an embodiment of a unique local address (ULA) 1098 that may be used to address each node in the fabric. In certain embodiments, the ULA 1098 may be formatted as an IPv6 address format containing 128 bits divided into a global ID 1100, a subnet ID 1102, and an interface ID 1104. The global ID 1100 includes 40 bits and the subnet ID 1102 includes 16 bits. The global ID 1100 and subnet ID 1102 together form a fabric ID 1103 for the fabric.

The fabric ID 1103 is a unique 64-bit identifier used to identify a fabric. The fabric ID 1103 may be generated at creation of the associated fabric using a pseudo-random algorithm. For example, the pseudo-random algorithm may 1) obtain the current time of day in 64-bit NTP format, 2) obtain the interface ID 1104 for the device, 3) concatenate the time of day with the interface ID 1104 to create a key, 4) compute and SHA-1 digest on the key resulting in 160 bits, 5) use the least significant 40 bits as the global ID 1100, and 6) concatenate the ULA and set the least significant bit to 1 to create the fabric ID 1103. In certain embodiments, once the fabric ID 1103 is created with the fabric, the fabric ID 1103 remains until the fabric is dissolved.

The global ID 1100 identifies the fabric to which the node belongs. The subnet ID 1102 identifies logical networks within the fabric. The subnet ID 1102 may be assigned monotonically starting at one with the addition of each new logical network to the fabric. For example, a WiFi network may be identified with a hex value of 0x01, and a later connected 802.15.4 network may be identified with a hex value of 0x02 continuing on incrementally upon the connection of each new network to the fabric.

Finally, the ULA 1098 includes an interface ID 1104 that includes 64 bits. The interface ID 1104 may be assigned using a globally-unique 64-bit identifier according to the IEEE EUI-64 standard. For example, devices with IEEE 802 network interfaces may derive the interface ID 1104 using a burned-in MAC address for the devices "primary interface." In some embodiments, the designation of which interface is the primary interface may be determined arbitrarily. In other embodiments, an interface type (e.g., WiFi) may be deemed the primary interface, when present. If the MAC address for the primary interface of a device is 48 bits rather than 64-bit, the 48-bit MAC address may be converted to a EUI-64 value via encapsulation (e.g., organizationally unique identifier encapsulating). In consumer devices (e.g., phones or computers), the interface ID 1104 may be assigned by the consumer devices' local operating systems.

ii. Routing Transmissions Between Logical Networks

As discussed above in relation to a star network topology, inter-network routing may occur in communication between two devices across logical networks. In some embodiments, inter-network routing is based on the subnet ID 1102. Each inter-networking node (e.g., node 1034 of FIG. 5) may maintain a list of other routing nodes (e.g., node B 14 of FIG. 5) on the hub network 1020 and their respective attached periphery networks (e.g., periphery network 1024 of FIG. 5). When a packet arrives addressed to a node other than the routing node itself, the destination address (e.g., address for node 1052 of FIG. 5) is compared to the list of network prefixes and a routing node (e.g., node 1044) is selected that is attached to the desired network (e.g., periphery network 1024). The packet is then forwarded to the selected routing node. If multiple nodes (e.g., 1034 and 1036) are attached to the same periphery network, routing nodes are selected in an alternating fashion.

Additionally, inter-network routing nodes may regularly transmit Neighbor Discovery Protocol (NDP) router advertisement messages on the hub network to alert consumer devices to the existence of the hub network and allow them to acquire the subnet prefix. The router advertisements may include one or more route information options to assist in routing information in the fabric. For example, these route information options may inform consumer devices of the existence of the periphery networks and how to route packets the periphery networks.

Figure 10:
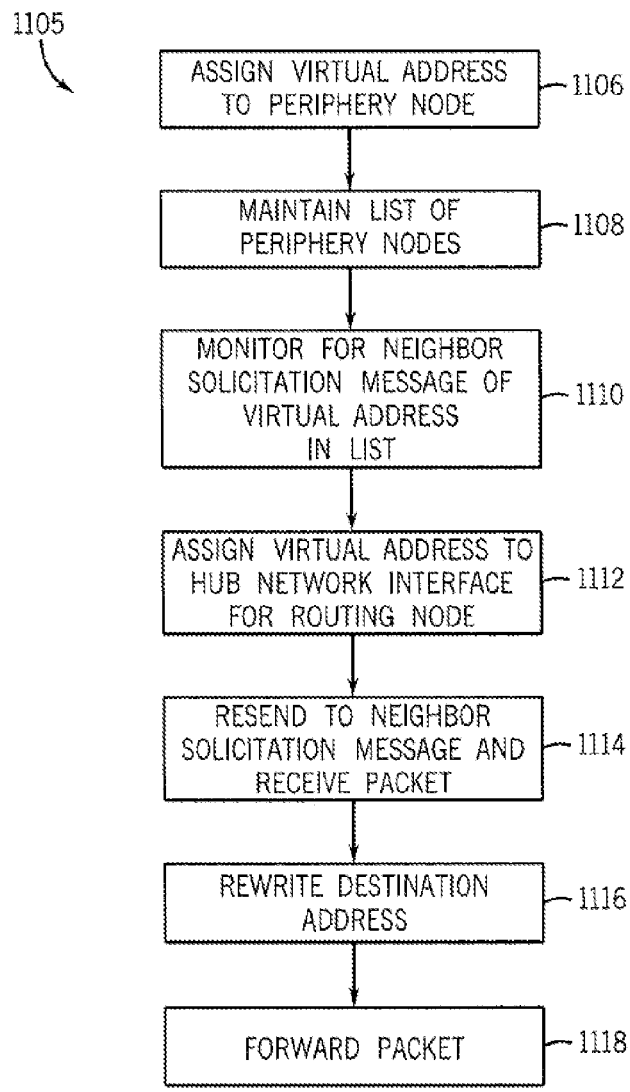
FIG. 10 illustrates a process for proxying periphery devices on a hub network, in accordance with an embodiment.

In addition to, or in place of route information options, routing nodes may act as proxies to provide a connection between consumer devices and devices in periphery networks, such as the process 1105 as illustrated in FIG. 10. As illustrated, the process 1105 includes each periphery network device being assigned a virtual address on the hub network by combining the subnet ID 1102 with the interface ID 1104 for the device on the periphery network (block 1106). To proxy using the virtual addresses, routing nodes maintain a list of all periphery nodes in the fabric that are directly reachable via one of its interfaces (block 1108). The routing nodes listen on the hub network for neighbor solicitation messages requesting the link address of a periphery node using its virtual address (block 1110). Upon receiving such a message, the routing node attempts to assign the virtual address to its hub interface after a period of time (block 1112). As part of the assignment, the routing node performs duplicate address detection so as to block proxying of the virtual address by more than one routing node. After the assignment, the routing node responds to the neighbor solicitation message and receives the packet (block 1114). Upon receiving the packet, the routing node rewrites the destination address to be the real address of the periphery node (block 1116) and forwards the message to the appropriate interface (block 1118).

iii. Consumer Devices Connecting to a Fabric

To join a fabric, a consumer device may discover an address of a node already in the fabric that the consumer device wants to join. Additionally, if the consumer device has been disconnected from a fabric for an extended period of time may need to rediscover nodes on the network if the fabric topology/layout has changed. To aid in discovery/rediscovery, fabric devices on the hub network may publish Domain Name System-Service Discovery (DNS-SD) records via mDNS that advertise the presence of the fabric and provide addresses to the consumer device III. Data Transmitted in the Fabric After creation of a fabric and address creation for the nodes, data may be transmitted through the fabric. Data passed through the fabric may be arranged in a format common to all messages and/or common to specific types of conversations in the fabric. In some embodiments, the message format may enable one-to-one mapping to JavaScript Object Notation (JSON) using a TLV serialization format discussed below. Additionally, although the following data frames are described as including specific sizes, it should be noted that lengths of the data fields in the data frames may be varied to other suitable bit-lengths.

It should be understood that each of the following data frames, profiles, and/or formats discussed below may be stored in memory (e.g., memory of the device 10) prior to and/or after transmission of a message. In other words, although the data frame, profiles, and formats may be generally discussed as transmissions of data, they may also be physically stored (e.g., in a buffer) before, during, and/or after transmission of the data frame, profiles, and/or formats. Moreover, the following data frames, profiles, schemas, and/or formats may be stored on a non-transitory, computer-readable medium that allows an electronic device to access the data frames, profiles, schemas, and/or formats. For example, instructions for formatting the data frames, profiles, schemas, and/or formats may be stored in any suitable computer-readable medium, such as in memory for the device 10, memory of another device, a portable memory device (e.g., compact disc, flash drive, etc.), or other suitable physical device suitable for storing the data frames, profiles, schemas, and/or formats.

A. Security

Along with data intended to be transferred, the fabric may transfer the data with additional security measures such as encryption, message integrity checks, and digital signatures. In some embodiments, a level of security supported for a device may vary according to physical security of the device and/or capabilities of the device. In certain embodiments, messages sent between nodes in the fabric may be encrypted using the Advanced Encryption Standard (AES) block cipher operating in counter mode (AES-CTR) with a 128-bit key. As discussed below, each message contains a 32-bit message id. The message id may be combined with a sending nodes id to form a nonce for the AES-CTR algorithm. The 32-bit counter enables 4 billion messages to be encrypted and sent by each node before a new key is negotiated.

In some embodiments, the fabric may insure message integrity using a message authentication code, such as HMAC-SHA-1, that may be included in each encrypted message. In some embodiments, the message authentication code may be generated using a 160-bit message integrity key that is paired one-to-one with the encryption key. Additionally, each node may check the message id of incoming messages against a list of recently received ids maintained on a node-by-node basis to block replay of the messages.

B. Tag Length Value (TLV) Formatting

To reduce power consumption, it is desirable to send at least a portion of the data sent over the fabric that compactly while enabling the data containers to flexibly represents data that accommodates skipping data that is not recognized or understood by skipping to the next location of data that is understood within a serialization of the data. In certain embodiments, tag-length-value (TLV) formatting may be used to compactly and flexibly encode/decode data. By storing at least a portion of the transmitted data in TLV, the data may be compactly and flexibly stored/sent along with low encode/decode and memory overhead, as discussed below in reference to Table 7. In certain embodiments, TLV may be used for some data as flexible, extensible data, but other portions of data that is not extensible may be stored and sent in an understood standard protocol data unit (PDU).

Data formatted in a TLV format may be encoded as TLV elements of various types, such as primitive types and container types. Primitive types include data values in certain formats, such as integers or strings. For example, the TLV format may encode: 1, 2, 3, 4, or 8 byte signed/unsigned integers, UTF-8 strings, byte strings, single/double-precision floating numbers (e.g., IEEE 754-1985 format), boolean, null, and other suitable data format types. Container types include collections of elements that are then sub-classified as container or primitive types. Container types may be classified into various categories, such as dictionaries, arrays, paths or other suitable types for grouping TLV elements, known as members. A dictionary is a collection of members each having distinct definitions and unique tags within the dictionary. An array is an ordered collection of members with implied definitions or no distinct definitions. A path is an ordered collection of members that described how to traverse a tree of TLV elements.

Figure 11:
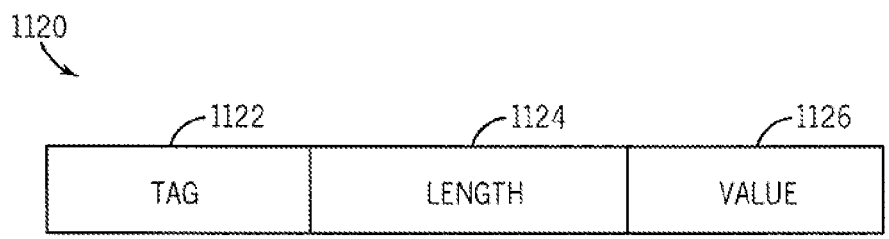
FIG. 11 illustrates a tag-length-value (TLV) packet that may be used to transmit data over the fabric network, in accordance with an embodiment.

As illustrated in FIG. 11, an embodiment of a TLV packet 1120 includes three data fields: a tag field 1122, a length field 1124, and a value field 1126. Although the illustrated fields 1122, 1124, and 1126 are illustrated as approximately equivalent in size, the size of each field may be variable and vary in size in relation to each other. In other embodiments, the TLV packet 1120 may further include a control byte before the tag field 1122.

In embodiments having the control byte, the control byte may be sub-divided into an element type field and a tag control field. In some embodiments, the element type field includes 5 lower bits of the control byte and the tag control field occupies the upper 3 bits. The element type field indicates the TLV element's type as well as the how the length field 1124 and value field 1126 are encoded. In certain embodiments, the element type field also encodes Boolean values and/or null values for the TLV. For example, an embodiment of an enumeration of element type field is provided in Table 1 below.

TABLE 1

Example element type field values.

| 7 | 6 | 5 | 4 | 3 | 2 | 1 | 0 | |
|---|---|---|---|---|---|---|---|---|
| | | | 0 | 0 | 0 | 0 | 0 | Signed Integer, 1 byte value |
| | | | 0 | 0 | 0 | 0 | 1 | Signed Integer, 2 byte value |
| | | | 0 | 0 | 0 | 1 | 0 | Signed Integer, 4 byte value |
| | | | 0 | 0 | 0 | 1 | 1 | Signed Integer, 8 byte value |
| | | | 0 | 0 | 1 | 0 | 0 | Unsigned Integer, 1 byte value |
| | | | 0 | 0 | 1 | 0 | 1 | Unsigned Integer, 2 byte value |
| | | | 0 | 0 | 1 | 1 | 0 | Unsigned Integer, 4 byte value |
| | | | 0 | 0 | 1 | 1 | 1 | Unsigned Integer, 8 byte value |
| | | | 0 | 1 | 0 | 0 | 0 | Boolean False |
| | | | 0 | 1 | 0 | 0 | 1 | Boolean True |
| | | | 0 | 1 | 0 | 1 | 0 | Floating Point Number, 4 byte value |
| | | | 0 | 1 | 0 | 1 | 1 | Floating Point Number, 8 byte value |
| | | | 0 | 1 | 1 | 0 | 0 | UTF8-String, 1 byte length |
| | | | 0 | 1 | 1 | 0 | 1 | UTF8-String, 2 byte length |
| | | | 0 | 1 | 1 | 1 | 0 | UTF8-String, 4 byte length |
| | | | 0 | 1 | 1 | 1 | 1 | UTF8-String, 8 byte length |
| | | | 1 | 0 | 0 | 0 | 0 | Byte String, 1 byte length |
| | | | 1 | 0 | 0 | 0 | 1 | Byte String, 2 byte length |
| | | | 1 | 0 | 0 | 1 | 0 | Byte String, 4 byte length |
| | | | 1 | 0 | 0 | 1 | 1 | Byte String, 8 byte length |
| | | | 1 | 0 | 1 | 0 | 0 | Null |
| | | | 1 | 0 | 1 | 0 | 1 | Dictionary |
| | | | 1 | 0 | 1 | 1 | 0 | Array |
| | | | 1 | 0 | 1 | 1 | 1 | Path |
| | | | 1 | 1 | 0 | 0 | 0 | End of Container |

The tag control field indicates a form of the tag in the tag field 1122 assigned to the TLV element (including a zero-length tag). Examples, of tag control field values are provided in Table 2 below.

TABLE 2

Example values for tag control field.

| 7 | 6 | 5 | 4 | 3 | 2 | 1 | 0 | |
|---|---|---|---|---|---|---|---|---|
| 0 | 0 | 0 | | | | | | Anonymous, 0 bytes |
| 0 | 0 | 1 | | | | | | Context-specific Tag, 1 byte |
| 0 | 1 | 0 | | | | | | Core Profile Tag, 2 bytes |
| 0 | 1 | 1 | | | | | | Core Profile Tag, 4 bytes |
| 1 | 0 | 0 | | | | | | Implicit Profile Tag, 2 bytes |
| 1 | 0 | 1 | | | | | | Implicit Profile Tag, 4 bytes |
| 1 | 1 | 0 | | | | | | Fully-qualified Tag, 6 bytes |
| 1 | 1 | 1 | | | | | | Fully-qualified Tag, 8 bytes |

In other words, in embodiments having a control byte, the control byte may indicate a length of the tag.

In certain embodiments, the tag field 1122 may include zero to eight bytes, such as eight, sixteen, thirty two, or sixty four bits. In some embodiments, the tag of the tag field may be classified as profile-specific tags or context-specific tags. Profile-specific tags identify elements globally using a vendor Id, a profile Id, and/or tag number as discussed below. Context-specific tags identify TLV elements within a context of a containing dictionary element and may include a single-byte tag number. Since context-specific tags are defined in context of their containers, a single context-specific tag may have different interpretations when included in different containers. In some embodiments, the context may also be derived from nested containers.

In embodiments having the control byte, the tag length is encoded in the tag control field and the tag field 1122 includes a possible three fields: a vendor Id field, a profile Id field, and a tag number field. In the fully-qualified form, the encoded tag field 1122 includes all three fields with the tag number field including 16 or 32 bits determined by the tag control field. In the implicit form, the tag includes only the tag number, and the vendor Id and profile number are inferred from the protocol context of the TLV element. The core profile form includes profile-specific tags, as discussed above. Context-specific tags are encoded as a single byte conveying the tag number. Anonymous elements have zero-length tag fields 1122.

In some embodiments without a control byte, two bits may indicate a length of the tag field 1122, two bits may indicate a length of the length field 1124, and four bits may indicate a type of information stored in the value field 1126. An example of possible encoding for the upper 8 bits for the tag field is illustrated below in Table 3.

TABLE 3

Tag field of a TLV packet

| Byte 0 | | | | | | | | |
|---|---|---|---|---|---|---|---|---|
| 7 | 6 | 5 | 4 | 3 | 2 | 1 | 0 | Description |
| 0 | 0 | — | — | — | — | — | — | Tag is 8 bits |
| 0 | 1 | — | — | — | — | — | — | Tag is 16 bits |
| 1 | 0 | — | — | — | — | — | — | Tag is 32 bits |
| 1 | 1 | — | — | — | — | — | — | Tag is 64 bits |
| — | — | 0 | 0 | — | — | — | — | Length is 8 bits |
| — | — | 0 | 1 | — | — | — | — | Length is 16 bits |
| — | — | 1 | 0 | — | — | — | — | Length is 32 bits |
| — | — | 1 | 1 | — | — | — | — | Length is 64 bits |
| — | — | — | — | 0 | 0 | 0 | 0 | Boolean |
| — | — | — | — | 0 | 0 | 0 | 1 | Fixed 8-bit Unsigned |
| — | — | — | — | 0 | 0 | 1 | 0 | Fixed 8-bit Signed |
| — | — | — | — | 0 | 0 | 1 | 1 | Fixed 16-bit Unsigned |
| — | — | — | — | 0 | 1 | 0 | 0 | Fixed 16-bit Signed |
| — | — | — | — | 0 | 1 | 0 | 1 | Fixed 32-bit Unsigned |
| — | — | — | — | 0 | 1 | 1 | 0 | Fixed 32-bit Signed |
| — | — | — | — | 0 | 1 | 1 | 1 | Fixed 64-bit Unsigned |
| — | — | — | — | 1 | 0 | 0 | 0 | Fixed 64-bit Signed |
| — | — | — | — | 1 | 0 | 0 | 1 | 32-bit Floating Point |
| — | — | — | — | 1 | 0 | 1 | 0 | 64-bit Floating Point |
| — | — | — | — | 1 | 0 | 1 | 1 | UTF-8 String |
| — | — | — | — | 1 | 1 | 0 | 0 | Opaque Data |
| — | — | — | — | 1 | 1 | 0 | 1 | Container |

As illustrated in Table 3, the upper 8 bits of the tag field 1122 may be used to encode information about the tag field 1122, length field 1124, and the value field 1126, such that the tag field 112 may be used to determine length for the tag field 122 and the length fields 1124. Remaining bits in the tag field 1122 may be made available for user-allocated and/or user-assigned tag values.

The length field 1124 may include eight, sixteen, thirty two, or sixty four bits as indicated by the tag field 1122 as illustrated in Table 3 or the element field as illustrated in Table 2. Moreover, the length field 1124 may include an unsigned integer that represents a length of the encoded in the value field 1126. In some embodiments, the length may be selected by a device sending the TLV element. The value field 1126 includes the payload data to be decoded, but interpretation of the value field 1126 may depend upon the tag length fields, and/or control byte. For example, a TLV packet without a control byte including an 8 bit tag is illustrated in Table 4 below for illustration.

TABLE 4

Example of a TLV packet including an 8-bit tag

| Tag | Length | Value | Description |
|---|---|---|---|
| 0x0d | 0x24 | | |
| 0x09 | 0x04 | 0x42 95 00 00 | 74.5 |
| 0x09 | 0x04 | 0x42 98 66 66 | 76.2 |
| 0x09 | 0x04 | 0x42 94 99 9a | 74.3 |
| 0x09 | 0x04 | 0x42 98 99 9a | 76.3 |
| 0x09 | 0x04 | 0x42 95 33 33 | 74.6 |
| 0x09 | 0x04 | 0x42 98 33 33 | 76.1 |

As illustrated in Table 4, the first line indicates that the tag field 1122 and the length field 1124 each have a length of 8 bits. Additionally, the tag field 1122 indicates that the tag type is for the first line is a container (e.g., the TLV packet). The tag field 1124 for lines two through six indicate that each entry in the TLV packet has a tag field 1122 and length field 1124 consisting of 8 bits each. Additionally, the tag field 1124 indicates that each entry in the TLV packet has a value field 1126 that includes a 32-bit floating point. Each entry in the value field 1126 corresponds to a floating number that may be decoded using the corresponding tag field 1122 and length field 1124 information. As illustrated in this example, each entry in the value field 1126 corresponds to a temperature in Fahrenheit. As can be understood, by storing data in a TLV packet as described above, data may be transferred compactly while remaining flexible for varying lengths and information as may be used by different devices in the fabric. Moreover, in some embodiments, multi-byte integer fields may be transmitted in little-endian order or big-endian order.

By transmitting TLV packets in using an order protocol (e.g., little-endian) that may be used by sending/receiving device formats (e.g., JSON), data transferred between nodes may be transmitted in the order protocol used by at least one of the nodes (e.g., little endian). For example, if one or more nodes include ARM or ix86 processors, transmissions between the nodes may be transmitted using little-endian byte ordering to reduce the use of byte reordering. By reducing the inclusion of byte reordering, the TLV format enable devices to communicate using less power than a transmission that uses byte reordering on both ends of the transmission. Furthermore, TLV formatting may be specified to provide a one-to-one translation between other data storage techniques, such as JSON+Extensible Markup Language (XML). As an example, the TLV format may be used to represent the following XML Property List:

```
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
  <key>OfflineMode</key>
  <false/>
  <key>Network</key>
  <dict>
    <key>IPv4</key>
    <dict>
      <key>Method</key>
      <string>dhcp</string>
    </dict>
    <key>IPv6</key>
    <dict>
      <key>Method</key>
      <string>auto</string>
    </dict>
  </dict>
  <key>Technologies</key>
  <dict>
    <key>wifi</key>
    <dict>
      <key>Enabled</key>
      <true/>
      <key>Devices</key>
      <dict>
        <key>wifi_18b4300008b027</key>
        <dict>
          <key>Enabled</key>
          <true/>
        </dict>
      </dict>
      <key>Services</key>
      <array>
        <string>wifi_18b4300008b027_3939382d33204
        16c70696e652054657 272616365</string>
      </array>
    </dict>
    <key>802.15.4</key>
    <dict>
      <key>Enabled</key>
      <true/>
      <key>Devices</key>
      <dict>
        <key>802.15.4_18b43000000002fac4</key>
        <dict>
          <key>Enabled</key>
          <true/>
        </dict>
      </dict>
      <key>Services</key>
      <array>
        <string>802.15.4_18b43000000002fac4_3
        939382d3320416c70696e6520546572</string>
      </array>
    </dict>
  </dict>
  <key>Services</key>
  <dict>
    <key>wifi_18b4300008b027_3939382d3320416c70696e6520546572
    72616365</key>
    <dict>
      <key>Name</key>
      <string>998-3 Alpine Terrace</string>
      <key>SSID</key>
      <data>3939382d3320416c70696e652054657272616365
      </data>
      <key>Frequency</key>
      <integer>2462</integer>
      <key>AutoConnect</key>
      <true/>
      <key>Favorite</key>
      <true/>
      <key>Error</key>
      <string/>
      <key>Network</key>
      <dict>
        <key>IPv4</key>
        <dict>
          <key>DHCP</key>
          <dict>
            <key>LastAddress</key>
            <data>0a02001e</data>
          </dict>
        </dict>
        <key>IPv6</key>
        <dict/>
      </dict>
    </dict>
    <key>802.15.4_18b43000000002fac4_3939382d3320416c70696e
    6520546572</key>
    <dict>
      <key>Name</key>
      <string>998-3 Alpine Ter</string>
      <key>EPANID</key>
      <data>3939382d3320416c70696e6520546572</data>
      <key>Frequency</key>
      <integer>2412</integer>
      <key>AutoConnect</key>
      <true/>
      <key>Favorite</key>
      <true/>
      <key>Error</key>
      <string/>
      <key>Network</key>
      <dict/>
    </dict>
  </dict>
</dict>
</plist>
```

As an example, the above property list may be represented in tags of the above described TLV format (without a control byte) according to Table 5 below.

TABLE 5

Example representation of the XML Property List in TLV format

| XML Key | Tag Type | Tag Number |
|---|---|---|
| OfflineMode | Boolean | 1 |
| IPv4 | Container | 3 |
| IPv6 | Container | 4 |
| Method | String | 5 |
| Technologies | Container | 6 |
| WiFi | Container | 7 |
| 802.15.4 | Container | 8 |
| Enabled | Boolean | 9 |
| Devices | Container | 10 |
| ID | String | 11 |
| Services | Container | 12 |
| Name | String | 13 |
| SSID | Data | 14 |
| EPANID | Data | 15 |
| Frequency | 16-bit Unsigned | 16 |
| AutoConnect | Boolean | 17 |
| Favorite | Boolean | 18 |
| Error | String | 19 |
| DHCP | String | 20 |
| LastAddress | Data | 21 |
| Device | Container | 22 |
| Service | Container | 23 |

Similarly, Table 6 illustrates an example of literal tag, length, and value representations for the example XML Property List.

TABLE 6

Example of literal values for tag, length, and value fields for XML Property List

| Tag | Length | Value | Description |
|---|---|---|---|
| 0x40 01 | 0x01 | 0 | OfflineMode |
| 0x4d 02 | 0x14 | | Network |
| 0x4d 03 | 0x07 | | Network.IPv4 |
| 0x4b 05 | 0x04 | "dhcp" | Network.IPv4.Method |
| 0x4d 04 | 0x07 | | Network.IPv6 |
| 0x4b 05 | 0x04 | "auto" | Network.IPv6.Method |
| 0x4d 06 | 0xd6 | | Technologies |
| 0x4d 07 | 0x65 | | Technologies.wifi |
| 0x40 09 | 0x01 | 1 | Technologies.wifi.Enabled |
| 0x4d 0a | 0x5e | | Technologies.wifi.Devices |
| 0x4d 16 | 0x5b | | Technologies.wifi.Devices.Device.[0] |
| 0x4b 0b | 0x13 | "wifi_18b43 . . . " | Technologies.wifi.Devices.Device.[0].ID |
| 0x40 09 | 0x01 | 1 | Technologies.wifi.Devices.Device.[0].Enabled |
| 0x4d 0c | 0x3e | | Technologies.wifi.Devices.Device.[0].Services |
| 0x0b | 0x3c | "wifi_18b43 . . . " | Technologies.wifi.Devices.Device.[0].Services.[0] |
| 0x4d 08 | 0x6b | | Technologies.802.15.4 |
| 0x40 09 | 0x01 | 1 | Technologies.802.15.4.Enabled |
| 0x4d 0a | 0x64 | | Technologies.802.15.4.Devices |
| 0x4d 16 | 0x61 | | Technologies.802.15.4.Devices.Device.[0] |
| 0x4b 0b | 0x1a | "802.15.4_18 . . . " | Technologies.802.15.4.Devices.Device.[0].ID |
| 0x40 09 | 0x01 | 1 | Technologies.802.15.4.Devices.Device.[0].Enabled |
| 0x4d 0c | 0x3d | | Technologies.802.15.4.Devices.Device.[0].Services |
| 0x0b | 0x3b | "802.15.4_18 . . . " | Technologies.802.15.4.Devices.Device.[0].Services.[0] |
| 0x4d 0c | 0xcb | | Services |
| 0x4d 17 | 0x75 | | Services.Service.[0] |
| 0x4b 0b | 0x13 | "wifi_18b43 . . . " | Services.Service.[0].ID |
| 0x4b 0d | 0x14 | "998-3 Alp . . . " | Services.Service.[0].Name |
| 0x4c 0f | 0x28 | 3939382d . . . | Services.Service.[0].SSID |
| 0x45 10 | 0x02 | 2462 | Services.Service.[0].Frequency |
| 0x40 11 | 0x01 | 1 | Services.Service.[0].AutoConnect |
| 0x40 12 | 0x01 | 1 | Services.Service.[0].Favorite |
| 0x4d 02 | 0x0d | | Services.Service.[0].Network |
| 0x4d 03 | 0x0a | | Services.Service.[0].Network.IPv4 |
| 0x4d 14 | 0x07 | | Services.Service.[0].Network.IPv4.DHCP |
| 0x45 15 | 0x04 | 0x0a02001e | Services.Service.[0].Network.IPv4.LastAddress |
| 0x4d 17 | 0x50 | | Services.Service.[1] |
| 0x4b 0b | 0x1a | "802.15.4_18 . . . " | Services.Service.[1].ID |
| 0x4c 0d | 0x10 | "998-3 Alp . . . " | Services.Service.[1].Name |
| 0x4c 0f | 0x10 | 3939382d . . . | Services.Service.[1].EPANID |
| 0x45 10 | 0x02 | 2412 | Services.Service.[1].Frequency |
| 0x40 11 | 0x01 | 1 | Services.Service.[1].AutoConnect |
| 0x40 12 | 0x01 | 1 | Services.Service.[1].Favorite |

The TLV format enables reference of properties that may also be enumerated with XML, but does so with a smaller storage size. For example, Table 7 illustrates a comparison of data sizes of the XML Property List, a corresponding binary property list, and the TLV format.

TABLE 7

Comparison of the sizes of property list data sizes.

| List Type | Size in Bytes | Percentage of XML Size |
|---|---|---|
| XML | 2,199 | — |
| Binary | 730 | −66.8% |
| TLV | 450 | −79.5% |

By reducing the amount of data used to transfer data, the TLV format enables the fabric 1000 transfer data to and/or from devices having short duty cycles due to limited power (e.g., battery supplied devices). In other words, the TLV format allows flexibility of transmission while increasing compactness of the data to be transmitted.

C. General Message Protocol

Figure 12:
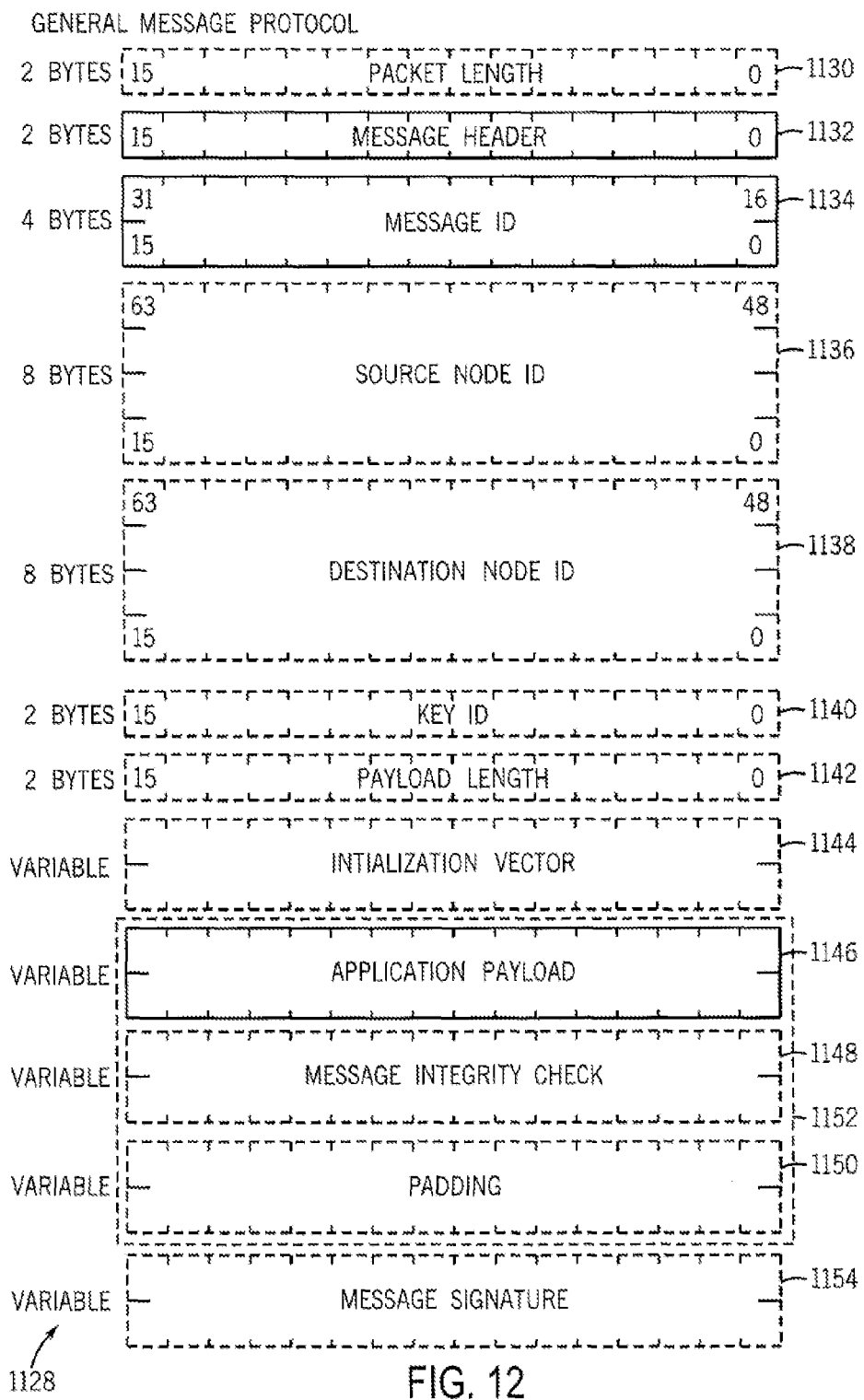
FIG. 12 illustrates a general message protocol (GMP) that may be used to transmit data over the fabric network that may include the TLV packet of FIG. 11, in accordance with an embodiment.

In addition to sending particular entries of varying sizes, data may be transmitted within the fabric using a general message protocol that may incorporate TLV formatting. An embodiment of a general message protocol (GMP) 1128 is illustrated in FIG. 12. In certain embodiments, the general message protocol (GMP) 1128 may be used to transmit data within the fabric. The GMP 1128 may be used to transmit data via connectionless protocols (e.g., UDP) and/or connection-oriented protocols (e.g., TCP). Accordingly, the GMP 1128 may flexibly accommodate information that is used in one protocol while ignoring such information when using another protocol. Moreover, the GMP 1226 may enable omission of fields that are not used in a specific transmission. Data that may be omitted from one or more GMP 1226 transfers is generally indicated using grey borders around the data units. In some embodiments, the multi-byte integer fields may be transmitted in a little-endian order or a big-endian order.

i. Packet Length

In some embodiments, the GMP 1128 may include a Packet Length field 1130. In some embodiments, the Packet Length field 1130 includes 2 bytes. A value in the Packet Length field 1130 corresponds to an unsigned integer indicating an overall length of the message in bytes, excluding the Packet Length field 1130 itself. The Packet Length field 1130 may be present when the GMP 1128 is transmitted over a TCP connection, but when the GMP 1128 is transmitted over a UDP connection, the message length may be equal to the payload length of the underlying UDP packet obviating the Packet Length field 1130.

ii. Message Header

Figure 13:
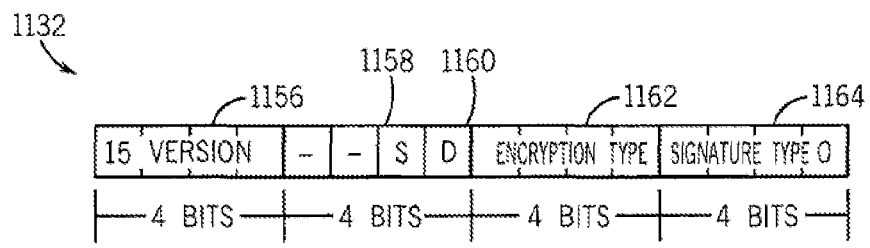
FIG. 13 illustrates a message header field of the GMP of FIG. 12, in accordance with an embodiment.

The GMP 1128 may also include a Message Header 1132 regardless of whether the GMP 1128 is transmitted using TCP or UDP connections. In some embodiments, the Message Header 1132 includes two bytes of data arranged in the format illustrated in FIG. 13. As illustrated in FIG. 13, the Message Header 1132 includes a Version field 1156. The Version field 1156 corresponds to a version of the GMP 1128 that is used to encode the message. Accordingly, as the GMP 1128 is updated, new versions of the GMP 1128 may be created, but each device in a fabric may be able to receive a data packet in any version of GMP 1128 known to the device. In addition to the Version field 1156, the Message Header 1132 may include an S Flag field 1158 and a D Flag 1160. The S Flag 1158 is a single bit that indicates whether a Source Node Id (discussed below) field is included in the transmitted packet. Similarly, the D Flag 1160 is a single bit that indicates whether a Destination Node Id (discussed below) field is included in the transmitted packet.

The Message Header 1132 also includes an Encryption Type field 1162. The Encryption Type field 1162 includes four bits that specify which type of encryption/integrity checking applied to the message, if any. For example, 0x0 may indicate that no encryption or message integrity checking is included, but a decimal 0x1 may indicate that AES-128-CTR encryption with HMAC-SHA-1 message integrity checking is included.

Finally, the Message Header 1132 further includes a Signature Type field 1164. The Signature Type field 1164 includes four bits that specify which type of digital signature is applied to the message, if any. For example, 0x0 may indicate that no digital signature is included in the message, but 0x1 may indicate that the Elliptical Curve Digital Signature Algorithm (ECDSA) with Prime256v1 elliptical curve parameters is included in the message.

iii. Message Id

Returning to FIG. 12, the GMP 1128 also includes a Message Id field 1134 that may be included in a transmitted message regardless of whether the message is sent using TCP or UDP. The Message Id field 1134 includes four bytes that correspond to an unsigned integer value that uniquely identifies the message from the perspective of the sending node. In some embodiments, nodes may assign increasing Message Id 1134 values to each message that they send returning to zero after reaching $2^{32}$ messages.

iv. Source Node Id

In certain embodiments, the GMP 1128 may also include a Source Node Id field 1136 that includes eight bytes. As discussed above, the Source Node Id field 1136 may be present in a message when the single-bit S Flag 1158 in the Message Header 1132 is set to 1. In some embodiments, the Source Node Id field 1136 may contain the Interface ID 1104 of the ULA 1098 or the entire ULA 1098. In some embodiments, the bytes of the Source Node Id field 1136 are transmitted in an ascending index-value order (e.g., EUI[0] then EUI[1] then EUI[2] then EUI[3], etc.).

v. Destination Node Id

The GMP 1128 may include a Destination Node Id field 1138 that includes eight bytes. The Destination Node Id field 1138 is similar to the Source Node Id field 1136, but the Destination Node Id field 1138 corresponds to a destination node for the message. The Destination Node Id field 1138 may be present in a message when the single-bit D Flag 1160 in the Message Header 1132 is set to 1. Also similar to the Source Node Id field 1136, in some embodiments, bytes of the Destination Node Id field 1138 may be transmitted in an ascending index-value order (e.g., EUI[0] then EUI[1] then EUI[2] then EUI[3], etc.).

vi. Key Id

In some embodiments, the GMP 1128 may include a Key Id field 1140. In certain embodiments, the Key Id field 1140 includes two bytes. The Key Id field 1140 includes an unsigned integer value that identifies the encryption/message integrity keys used to encrypt the message. The presence of the Key Id field 1140 may be determined by the value of Encryption Type field 1162 of the Message Header 1132. For example, in some embodiments, when the value for the Encryption Type field 1162 of the Message Header 1132 is 0x0, the Key Id field 1140 may be omitted from the message.

Figure 14:
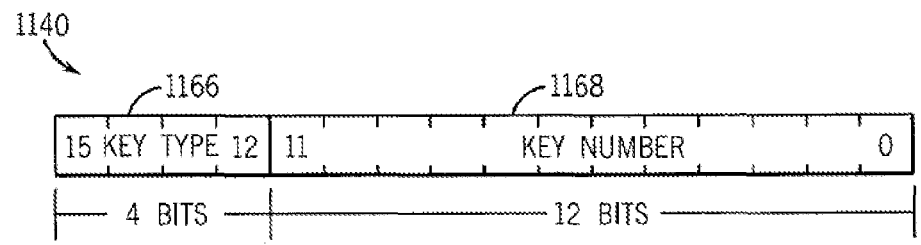
FIG. 14 illustrates a key identifier field of the GMP of FIG. 12, in accordance with an embodiment.

An embodiment of the Key Id field 1140 is presented in FIG. 14. In the illustrated embodiment, the Key Id field 1140 includes a Key Type field 1166 and a Key Number field 1168. In some embodiments, the Key Type field 1166 includes four bits. The Key Type field 1166 corresponds to an unsigned integer value that identifies a type of encryption/message integrity used to encrypt the message. For example, in some embodiments, if the Key Type field 1166 is 0x0, the fabric key is shared by all or most of the nodes in the fabric. However, if the Key Type field 1166 is 0x1, the fabric key is shared by a pair of nodes in the fabric.

The Key Id field 1140 also includes a Key Number field 1168 that includes twelve bits that correspond to an unsigned integer value that identifies a particular key used to encrypt the message out of a set of available keys, either shared or fabric keys.

vii. Payload Length

In some embodiments, the GMP 1128 may include a Payload Length field 1142. The Payload Length field 1142, when present, may include two bytes. The Payload Length field 1142 corresponds to an unsigned integer value that indicates a size in bytes of the Application Payload field. The Payload Length field 1142 may be present when the message is encrypted using an algorithm that uses message padding, as described below in relation to the Padding field.

viii. Initialization Vector

In some embodiments, the GMP 1128 may also include an Initialization Vector (IV) field 1144. The IV field 1144, when present, includes a variable number of bytes of data. The IV field 1144 contains cryptographic IV values used to encrypt the message. The IV field 1144 may be used when the message is encrypted with an algorithm that uses an IV. The length of the IV field 1144 may be derived by the type of encryption used to encrypt the message.

ix. Application Payload

The GMP 1128 includes an Application Payload field 1146. The Application Payload field 1146 includes a variable number of bytes. The Application Payload field 1146 includes application data conveyed in the message. The length of the Application Payload field 1146 may be determined from the Payload Length field 1142, when present. If the Payload Length field 1142 is not present, the length of the Application Payload field 1146 may be determined by subtracting the length of all other fields from the overall length of the message and/or data values included within the Application Payload 1146 (e.g., TLV).

Figure 15:
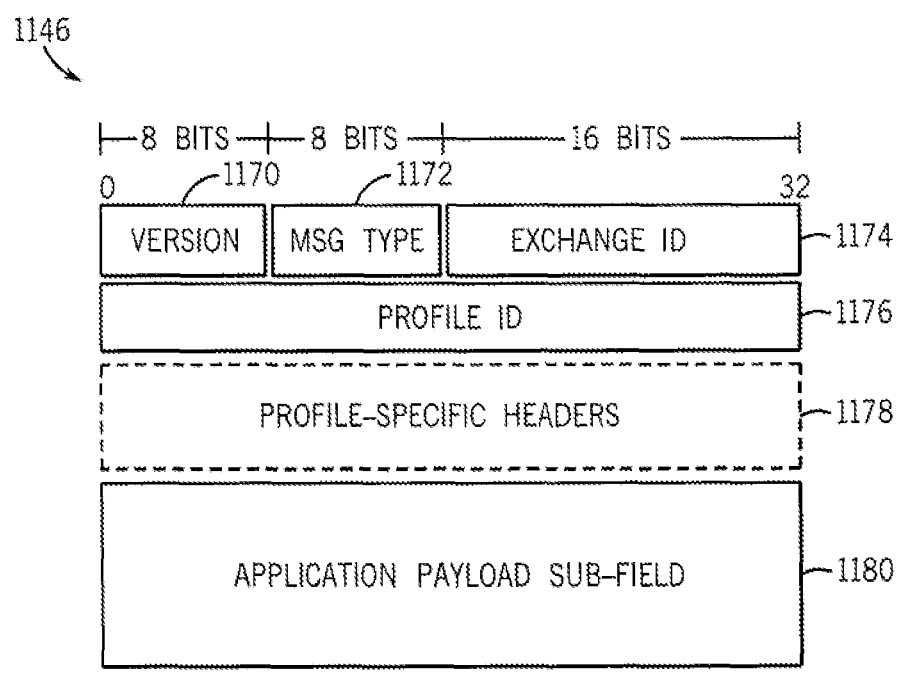
FIG. 15 illustrates an application payload field of the GMP of FIG. 12, in accordance with an embodiment.

An embodiment of the Application Payload field 1146 is illustrated in FIG. 15. The Application Payload field 1146 includes an APVersion field 1170. In some embodiments, the APVersion field 1170 includes eight bits that indicate what version of fabric software is supported by the sending device. The Application Payload field 1146 also includes a Message Type field 1172. The Message Type field 1172 may include eight bits that correspond to a message operation code that indicates the type of message being sent within a profile. For example, in a software update profile, a 0x00 may indicate that the message being sent is an image announce. The Application Payload field 1146 further includes an Exchange Id field 1174 that includes sixteen bits that corresponds to an exchange identifier that is unique to the sending node for the transaction.

In addition, the Application Payload field 1146 includes a Profile Id field 1176. The Profile Id 1176 indicates a "theme of discussion" used to indicate what type of communication occurs in the message. The Profile Id 1176 may correspond to one or more profiles that a device may be capable of communicating. For example, the Profile Id 1176 may indicate that the message relates to a core profile, a software update profile, a status update profile, a data management profile, a climate and comfort profile, a security profile, a safety profile, and/or other suitable profile types. Each device on the fabric may include a list of profiles which are relevant to the device and in which the device is capable of "participating in the discussion." For example, many devices in a fabric may include the core profile, the software update profile, the status update profile, and the data management profile, but only some devices would include the climate and comfort profile. The APVersion field 1170, Message Type field 1172, the Exchange Id field, the Profile Id field 1176, and the Profile-Specific Header field 1176, if present, may be referred to in combination as the "Application Header."

In some embodiments, an indication of the Profile Id via the Profile Id field 1176 may provide sufficient information to provide a schema for data transmitted for the profile. However, in some embodiments, additional information may be used to determine further guidance for decoding the Application Payload field 1146. In such embodiments, the Application Payload field 1146 may include a Profile-Specific Header field 1178. Some profiles may not use the Profile-Specific Header field 1178 thereby enabling the Application Payload field 1146 to omit the Profile-Specific Header field 1178. Upon determination of a schema from the Profile Id field 1176 and/or the Profile-Specific Header field 1178, data may be encoded/decoded in the Application Payload sub-field 1180. The Application Payload sub-field 1180 includes the core application data to be transmitted between devices and/or services to be stored, rebroadcast, and/or acted upon by the receiving device/service.

x. Message Integrity Check

Returning to FIG. 12, in some embodiments, the GMP 1128 may also include a Message Integrity Check (MIC) field 1148. The MIC field 1148, when present, includes a variable length of bytes of data containing a MIC for the message. The length and byte order of the field depends upon the integrity check algorithm in use. For example, if the message is checked for message integrity using HMAC-SHA-1, the MIC field 1148 includes twenty bytes in big-endian order. Furthermore, the presence of the MIC field 1148 may be determined by whether the Encryption Type field 1162 of the Message Header 1132 includes any value other than 0x0.

xi. Padding

The GMP 1128 may also include a Padding field 1150. The Padding field 1150, when present, includes a sequence of bytes representing a cryptographic padding added to the message to make the encrypted portion of the message evenly divisible by the encryption block size. The presence of the Padding field 1150 may be determined by whether the type of encryption algorithm (e.g., block ciphers in cipher-block chaining mode) indicated by the Encryption Type field 1162 in the Message Header 1132 uses cryptographic padding.

xii. Encryption

The Application Payload field 1146, the MIC field 1148, and the Padding field 1150 together form an Encryption block 1152. The Encryption block 1152 includes the portions of the message that are encrypted when the Encryption Type field 1162 in the Message Header 1132 is any value other than 0x0.

xiii. Message Signature

The GMP 1128 may also include a Message Signature field 1154. The Message Signature field 1154, when present, includes a sequence of bytes of variable length that contains a cryptographic signature of the message. The length and the contents of the Message Signature field may be determined according to the type of signature algorithm in use and indicated by the Signature Type field 1164 of the Message Header 1132. For example, if ECDSA using the Prime256v1 elliptical curve parameters is the algorithm in use, the Message Signature field 1154 may include two thirty-two bit integers encoded in little-endian order.

IV. Profiles and Protocols

As discussed above, one or more schemas of information may be selected upon desired general discussion type for the message. A profile may consist of one or more schemas. For example, one set of schemas of information may be used to encode/decode data in the Application Payload sub-field 1180 when one profile is indicated in the Profile Id field 1176 of the Application Payload 1146. However, a different set of schemas may be used to encode/decode data in the Application Payload sub-field 1180 when a different profile is indicated in the Profile Id field 1176 of the Application Payload 1146.

Figure 16:
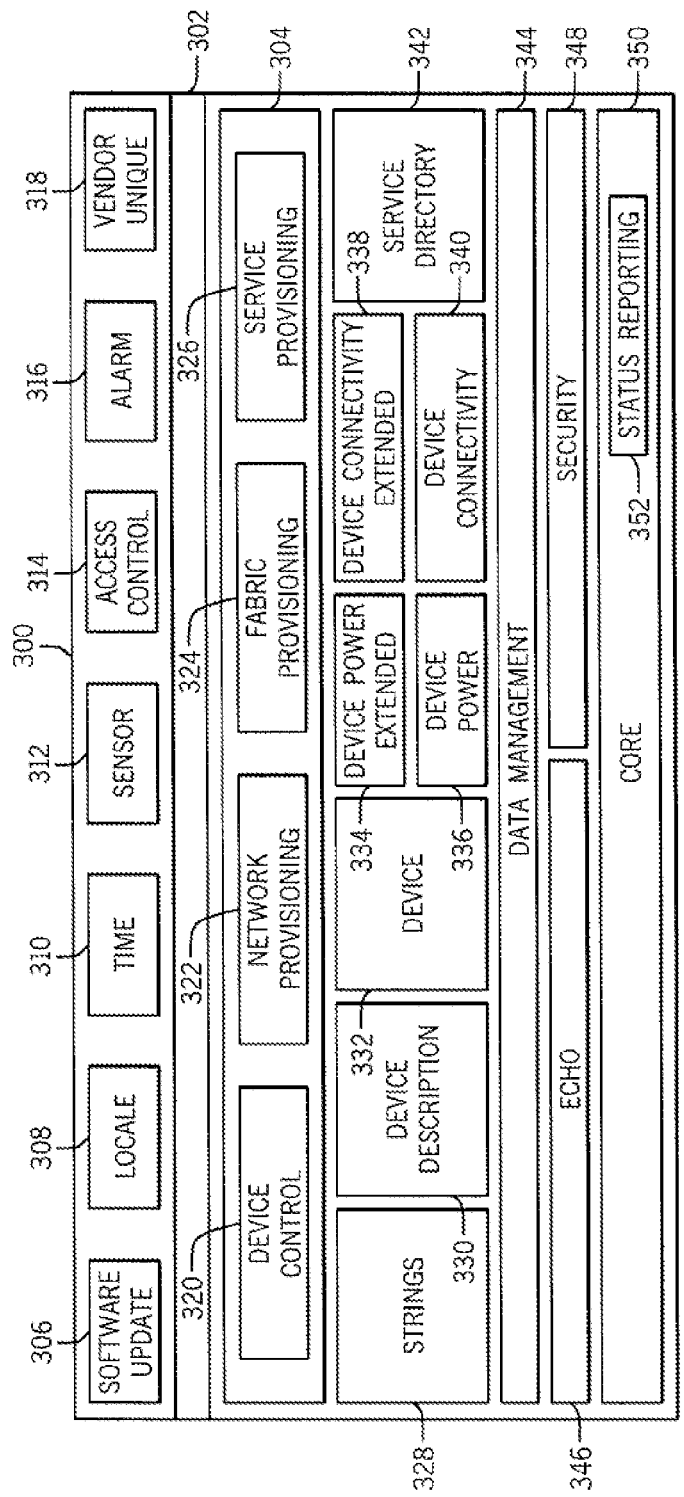
FIG. 16 illustrates a profile library that includes various profiles that may be used in the application payload field of FIG. 15.

FIG. 16 illustrates a schematic view of a variety of profiles that may be used in various messages. For example, one or more profile schemas may be stored in a profile library 300 that may be used by the devices to encode or decode messages based on a profile ID. The profile library 300 may organize the profiles into groups. For example, an application- and vendor-specific profile group 302 of profiles may be application- and vendor-specific profiles, and a provisioning group 304 of profiles may profiles used to provision networks, services, and/or fabrics. The application- and vendor-specific profile group 302 may include a software update profile 306, a locale profile 308, a time profile 310, a sensor profile 312, an access control profile 314, an alarm profile 316, and one or more vendor unique profiles 318. The software update profile 306 may be used by the devices to update software within the devices. The locale profile 308 may be used to specify a location and/or language set as the active locale for the device. The alarm profile 316 may be used to send, read, and propagate alarms.

The profiles library 300 may also include a device control profile 320, a network provisioning profile 322, a fabric provisioning profile 324, and a service provisioning profile 326. The device control profile 320 allows one device to request that another device exercise a specified device control (e.g., arm failsafe, etc.) capability. The network provisioning profile 322 enables a device to be added to a new logical network (e.g., WiFi or 802.15.4). The fabric provisioning profile 324 allows the devices to join a pre-existing fabric or create a new fabric. The service provisioning profile 326 enables the devices to be paired to a service.

The profiles library 300 may also include a strings profile 328, a device description profile 330, a device profile 332, device power extended profile 334, a device power profile 336, a device connectivity extended profile 338, a device connectivity profile 340, a service directory profile 342, a data management profile 344, an echo profile 346, a security profile 348, and a core profile 350. The device description profile 330 may be used by a device to identify one or more other devices. The service directory profile 342 enables a device to communicate with a service. The data management profile 344 enables devices to view and/or track data stored in another device. The echo profile 346 enables a device to determine whether the device is connected to a target device and the latency in the connection. The security profile 348 enables the devices to communicate securely.

The core profile 350 includes a status reporting profile 352 that enables devices to report successes and failures of requested actions. Additionally, in certain embodiments, each device may include a set of methods used to process profiles. For example, a core protocol may include the following profiles: GetProfiles, GetSchema, GetSchemas, GetProperty, GetProperties, SetProperty, SetProperties, RemoveProperty, RemoveProperties, RequestEcho, NotifyPropertyChanged, and/or NotifyPropertiesChanged. The Get Profiles method may return an array of profiles supported by a queried node. The GetSchema and GetSchemas methods may respectively return one or all schemas for a specific profile. GetProperty and GetProperties may respectively return a value or all value pairs for a profile schema. SetProperty and SetProperties may respectively set single or multiple values for a profile schema. RemoveProperty and RemoveProperties may respectively attempt to remove a single or multiple values from a profile schema. RequestEcho may send an arbitrary data payload to a specified node which the node returns unmodified. NotifyPropertyChange and NotifyPropertiesChanged may respectively issue a notification if a single/multiple value pairs have changed for a profile schema.

To aid in understanding profiles and schemas, a non-exclusive list of profiles and schemas are provided below for illustrative purposes.

A. Status Reporting

Figure 17:
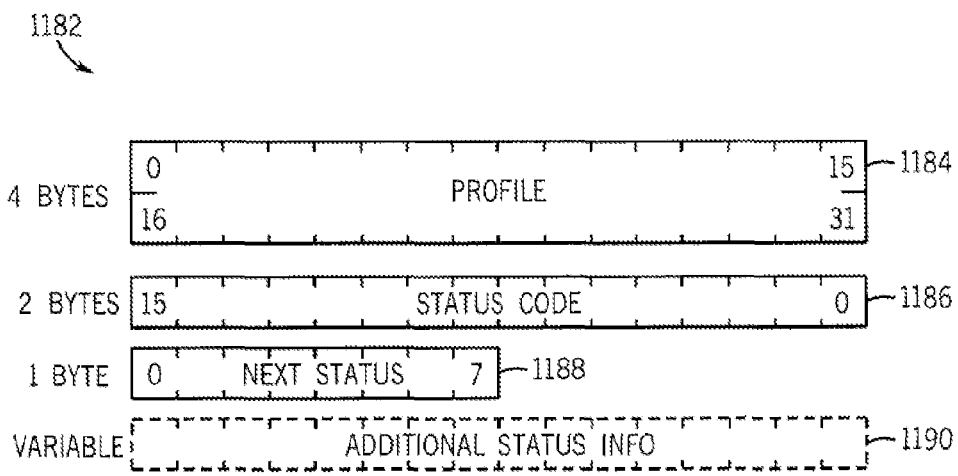
FIG. 17 illustrates a status reporting schema that may be used to update status information in the fabric network, in accordance with an embodiment.

A status reporting schema is presented as the status reporting frame 1182 in FIG. 17. The status reporting schema may be a separate profile or may be included in one or more profiles (e.g., a core profile). In certain embodiments, the status reporting frame 1182 includes a profile field 1184, a status code field 1186, a next status field 1188, and may include an additional status info field 1190.

i. Profile Field

Figure 18:
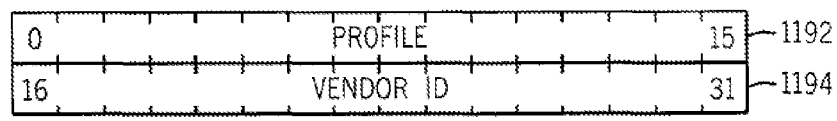
FIG. 18 illustrates a profile field of the status reporting schema of FIG. 17, in accordance with an embodiment.

In some embodiments, the profile field 1184 includes four bytes of data that defines the profile under which the information in the present status report is to be interpreted. An embodiment of the profile field 1184 is illustrated in FIG. 18 with two sub-fields. In the illustrated embodiment, the profile field 1184 includes a profile Id sub-field 1192 that includes sixteen bits that corresponds to a vendor-specific identifier for the profile under which the value of the status code field 1186 is defined. The profile field 1184 may also includes a vendor Id sub-field 1194 that includes sixteen bits that identifies a vendor providing the profile identified in the profile Id sub-field 1192.

ii. Status Code

In certain embodiments, the status code field 1186 includes sixteen bits that encode the status that is being reported. The values in the status code field 1186 are interpreted in relation to values encoded in the vendor Id sub-field 1192 and the profile Id sub-field 1194 provided in the profile field 1184. Additionally, in some embodiments, the status code space may be divided into four groups, as indicated in Table 8 below.

TABLE 8

Status Code Range Table

| Range | Name | Description |
| --- | --- | --- |
| 0x0000 ... 0x0010 | success | A request was successfully processed. |
| 0x0011 ... 0x0020 | client error | An error has or may have occurred on the client-side of a client/server exchange. For example, the client has made a badly-formed request. |
| 0x0021 ... 0x0030 | server error | An error has or may have occurred on the server side of a client/server exchange. For example, the server has failed to process a client request to an operating system error. |
| 0x0031 ... 0x0040 | continue/ redirect | Additional processing will be used, such as redirection, to complete a particular exchange, but no errors yet. |

Although Table 8 identifies general status code ranges that may be used separately assigned and used for each specific profile Id, in some embodiments, some status codes may be common to each of the profiles. For example, these profiles may be identified using a common profile (e.g., core profile) identifier, such as 0x00000000.

iii. Next Status

In some embodiments, the next status code field 1188 includes eight bits. The next status code field 1188 indicates whether there is following status information after the currently reported status. If following status information is to be included, the next status code field 1188 indicates what type of status information is to be included. In some embodiments, the next status code field 1188 may always be included, thereby potentially increasing the size of the message. However, by providing an opportunity to chain status information together, the potential for overall reduction of data sent may be reduced. If the next status field 1186 is 0x00, no following status information field 1190 is included. However, non-zero values may indicate that data may be included and indicate the form in which the data is included (e.g., in a TLV packet).

iv. Additional Status Info

When the next status code field 1188 is non-zero, the additional status info field 1190 is included in the message. If present, the status item field may contain status in a form that may be determined by the value of the preceding status type field (e.g., TLV format)

B. Software Update

The software update profile or protocol is a set of schemas and a client/server protocol that enables clients to be made aware of or seek information about the presence of software that they may download and install. Using the software update protocol, a software image may be provided to the profile client in a format known to the client. The subsequent processing of the software image may be generic, device-specific, or vendor-specific and determined by the software update protocol and the devices.

i. General Application Headers for the Application Payload

In order to be recognized and handled properly, software update profile frames may be identified within the Application Payload field 1146 of the GMP 1128. In some embodiments, all software update profile frames may use a common Profile Id 1176, such as 0x0000000C. Additionally, software update profile frames may include a Message Type field 1172 that indicates additional information and may chosen according to Table 9 below and the type of message being sent.

TABLE 9

Software update profile message types

| Type | Message |
| --- | --- |
| 0x00 | image announce |
| 0x01 | image query |
| 0x02 | image query response |
| 0x03 | download notify |
| 0x04 | notify response |
| 0x05 | update notify |
| 0x06 ... 0xff | reserved |

Additionally, as described below, the software update sequence may be initiated by a server sending the update as an image announce or a client receiving the update as an image query. In either embodiment, an Exchange Id 1174 from the initiating event is used for all messages used in relation to the software update.

ii. Protocol Sequence

Figure 19:
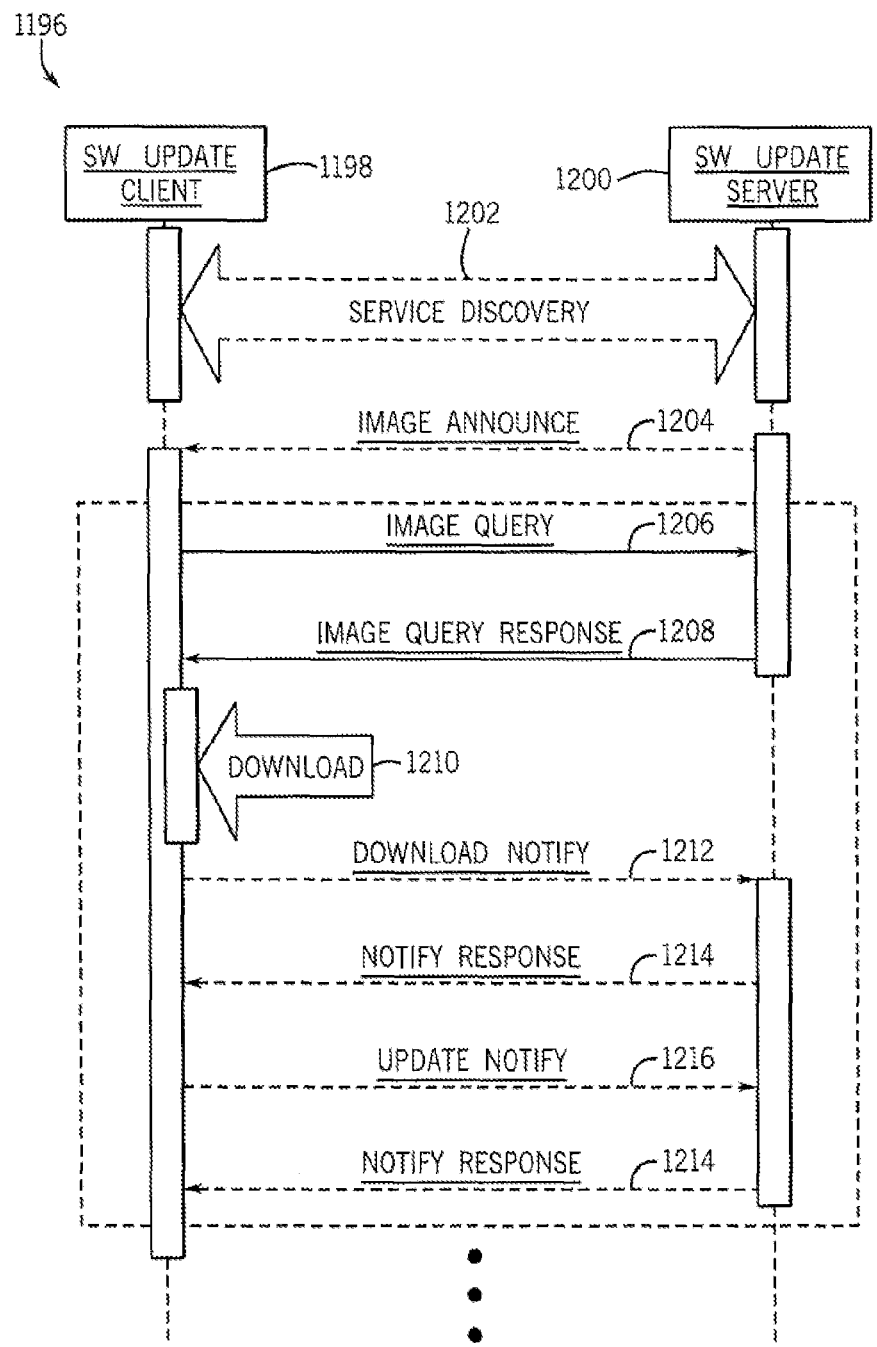
FIG. 19 illustrates a protocol sequence that may be used to perform a software update between a client and a server, in accordance with an embodiment.

FIG. 19 illustrates an embodiment of a protocol sequence 1196 for a software update between a software update client 1198 and a software update server 1200. In certain embodiments, any device in the fabric may be the software update client 1198 or the software update server 1200. Certain embodiments of the protocol sequence 1196 may include additional steps, such as those illustrated as dashed lines that may be omitted in some software update transmissions.

1. Service Discovery

In some embodiments, the protocol sequence 1196 begins with a software update profile server announcing a presence of the update. However, in other embodiments, such as the illustrated embodiment, the protocol sequence 1196 begins with a service discovery 1202, as discussed above.

2. Image Announce

In some embodiments, an image announce message 1204 may be multicast or unicast by the software update server 1200. The image announce message 1204 informs devices in the fabric that the server 1200 has a software update to offer. If the update is applicable to the client 1198, upon receipt of the image announce message 1204, the software update client 1198 responds with an image query message 1206. In certain embodiments, the image announce message 1204 may not be included in the protocol sequence 1196. Instead, in such embodiments, the software update client 1198 may use a polling schedule to determine when to send the image query message 1206.

3. Image Query

Figure 20:
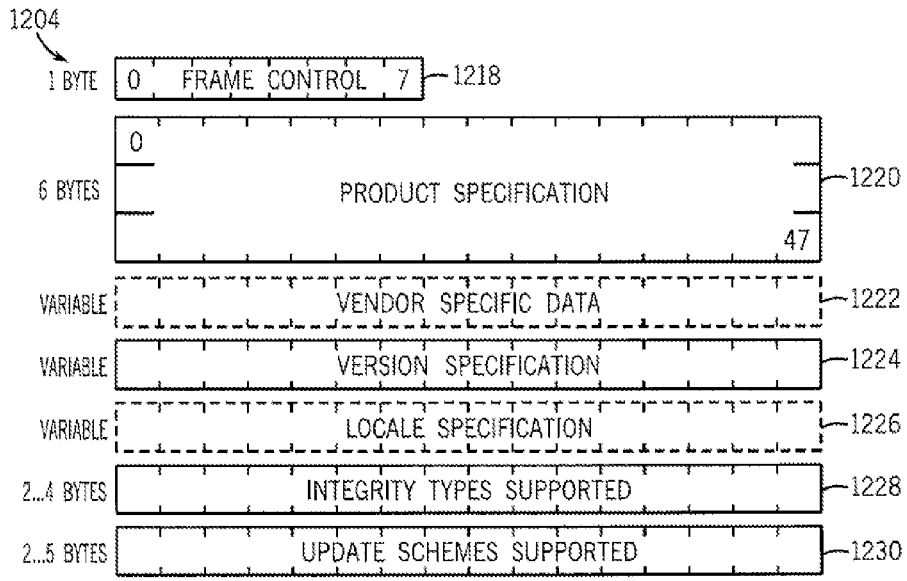
FIG. 20 illustrates an image query frame that may be used in the protocol sequence of FIG. 19, in accordance with an embodiment.

In certain embodiments, the image query message 1206 may be unicast from the software update client 1198 either in response to an image announce message 1204 or according to a polling schedule, as discussed above. The image query message 1206 includes information from the client 1198 about itself. An embodiment of a frame of the image query message 1206 is illustrated in FIG. 20. As illustrated in FIG. 20, certain embodiments of the image query message 1206 may include a frame control field 1218, a product specification field 1220, a vendor specific data field 1222, a version specification field 1224, a locale specification field 1226, an integrity type supported field 1228, and an update schemes supported field 1230.

a. Frame Control

Figure 21:
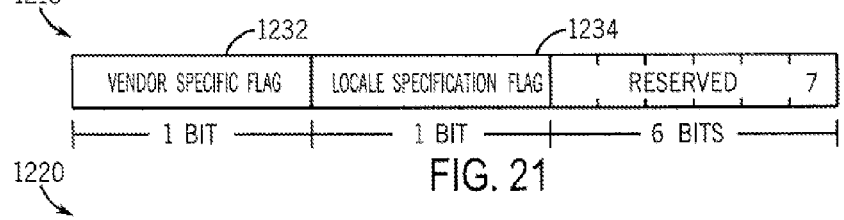
FIG. 21 illustrates a frame control field of the image query frame of FIG. 20, in accordance with an embodiment.

The frame control field 1218 includes 1 byte and indicates various information about the image query message 1204. An example of the frame control field 128 is illustrated in FIG. 21. As illustrated, the frame control field 1218 may include three sub-fields: vendor specific flag 1232, locale specification flag 1234, and a reserved field S3. The vendor specific flag 1232 indicates whether the vendor specific data field 1222 is included in the message image query message. For example, when the vendor specific flag 1232 is 0 no vendor specific data field 1222 may be present in the image query message, but when the vendor specific flag 1232 is 1 the vendor specific data field 1222 may be present in the image query message. Similarly, a 1 value in the locale specification flag 1234 indicates that a locale specification field 1226 is present in the image query message, and a 0 value indicates that the locale specification field 1226 in not present in the image query message.

b. Product Specification

Figure 22:
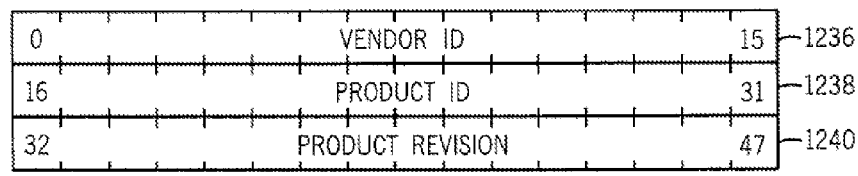
FIG. 22 illustrates a product specification field of the image query frame of FIG. 20, in accordance with an embodiment.

The product specification field 1220 is a six byte field. An embodiment of the product specification field 1220 is illustrated in FIG. 22. As illustrated, the product specification field 1220 may include three sub-fields: a vendor Id field 1236, a product Id field 1238, and a product revision field 1240. The vendor Id field 1236 includes sixteen bits that indicate a vendor for the software update client 1198. The product Id field 1238 includes sixteen bits that indicate the device product that is sending the image query message 1206 as the software update client 1198. The product revision field 1240 includes sixteen bits that indicate a revision attribute of the software update client 1198.

c. Vendor Specific Data

The vendor specific data field 1222, when present in the image query message 1206, has a length of a variable number of bytes. The presence of the vendor specific data field 1222 may be determined from the vendor specific flag 1232 of the frame control field 1218. When present, the vendor specific data field 1222 encodes vendor specific information about the software update client 1198 in a TLV format, as described above.

d. Version Specification

Figure 23:
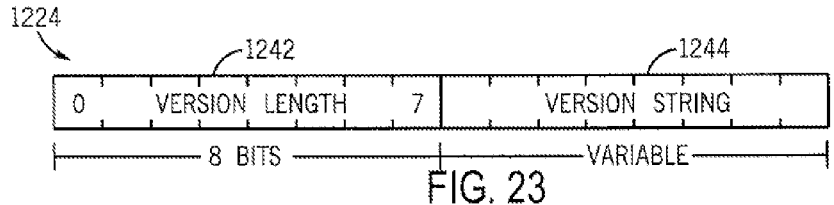
FIG. 23 illustrates a version specification field of the image query frame of FIG. 20, in accordance with an embodiment.

An embodiment of the version specification field 1224 is illustrated in FIG. 23. The version specification field 1224 includes a variable number of bytes sub-divided into two sub-fields: a version length field 1242 and a version string field 1244. The version length field 1242 includes eight bits that indicate a length of the version string field 1244. The version string field 1244 is variable in length and determined by the version length field 1242. In some embodiments, the version string field 1244 may be capped at 255 UTF-8 characters in length. The value encoded in the version string field 1244 indicates a software version attribute for the software update client 1198.

e. Locale Specification

Figure 24:
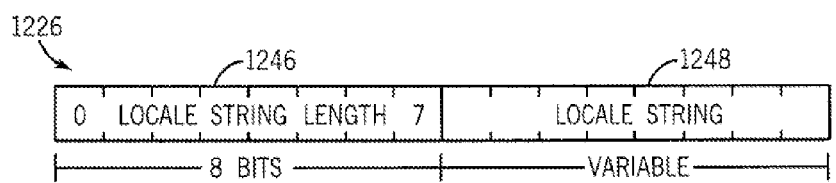
FIG. 24 illustrates a locale specification field of the image query frame of FIG. 20, in accordance with an embodiment.

In certain embodiments, the locale specification field 1226 may be included in the image query message 1206 when the locale specification flag 1234 of the frame control 1218 is 1. An embodiment of the locale specification field 1226 is illustrated in FIG. 24. The illustrated embodiment of the locale specification field 1226 includes a variable number of bytes divided into two sub-fields: a locale string length field 1246 and a locale string field 1248. The locale string length field 1246 includes eight bits that indicate a length of the locale string field 1248. The locale string field 1248 of the locale specification field 1226 may be variable in length and contain a string of UTF-8 characters encoding a local description based on Portable Operating System Interface (POSIX) locale codes. The standard format for POSIX locale codes is [language[_territory][.codeset][@modifier]] For example, the POSIX representation for Australian English is en_A-U.UTF8.

f. Integrity Types Supported

Figure 25:
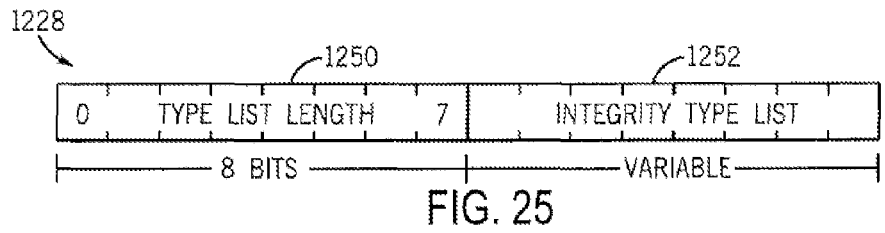
FIG. 25 illustrates an integrity types supported field of the image query frame of FIG. 20, in accordance with an embodiment.

An embodiment of the integrity types field 1228 is illustrated in FIG. 25. The integrity types supported field 1228 includes two to four bytes of data divided into two sub-fields: a type list length field 1250 and an integrity type list field 1252. The type list length field 1250 includes eight bits that indicate the length in bytes of the integrity type list field 1252. The integrity type list field 1252 indicates the value of the software update integrity type attribute of the software update client 1198. In some embodiments, the integrity type may be derived from Table 10 below.

TABLE 10

Example integrity types

| Value | Integrity Type |
|-------|----------------|
| 0x00  | SHA-160        |
| 0x01  | SHA-256        |
| 0x02  | SHA-512        |

The integrity type list field 1252 may contain at least one element from Table 10 or other additional values not included.

g. Update Schemes Supported

Figure 26:
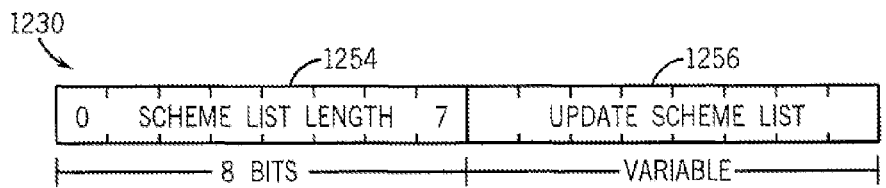
FIG. 26 illustrates an update schemes supported field of the image query frame of FIG. 20, in accordance with an embodiment.

An embodiment of the schemes supported field 1230 is illustrated in FIG. 26. The schemes supported field 1230 includes a variable number of bytes divided into two sub-fields: a scheme list length field 1254 and an update scheme list field 1256. The scheme list length field 1254 includes eight bits that indicate a length of the update scheme list field in bytes. The update scheme list field 1256 of the update schemes supported field 1222 is variable in length determined by the scheme list length field 1254. The update scheme list field 1256 represents an update schemes attributes of the software update profile of the software update client 1198. An embodiment of example values is shown in Table 11 below.

TABLE 11

Example update schemes

| Value | Update Scheme |
|-------|---------------|
| 0x00  | HTTP |
| 0x01  | HTTPS |
| 0x02  | SFTP |
| 0x03  | Fabric-specific File Transfer Protocol (e.g., Bulk Data Transfer discussed below) |

Upon receiving the image query message 1206, the software update server 1200 uses the transmitted information to determine whether the software update server 1200 has an update for the software update client 1198 and how best to deliver the update to the software update client 1198.

4. Image Query Response

Returning to FIG. 19, after the software update server 1200 receives the image query message 1206 from the software update client 1198, the software update server 1200 responds with an image query response 1208. The image query response 1208 includes either information detailing why an update image is not available to the software update client 1198 or information about the available image update to enable to software update client 1198 to download and install the update.

Figure 27:
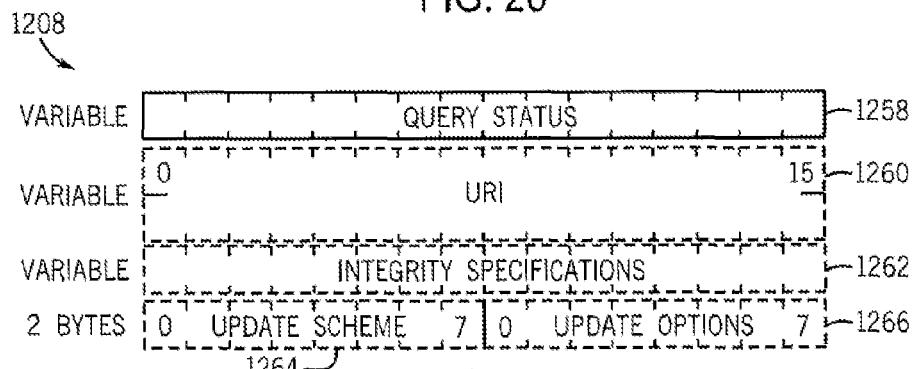
FIG. 27 illustrates an image query response frame that may be used in the protocol sequence of FIG. 19, in accordance with an embodiment.

An embodiment of a frame of the image query response 1208 is illustrated in FIG. 27. As illustrated, the image query response 1208 includes five possible sub-fields: a query status field 1258, a uniform resource identifier (URI) field 1260, an integrity specification field 1262, an update scheme field 1264, and an update options field 1266.

a. Query Status

The query status field 1258 includes a variable number of bytes and contains status reporting formatted data, as discussed above in reference to status reporting. For example, the query status field 1258 may include image query response status codes, such as those illustrated below in Table 12.

TABLE 12

Example image query response status codes

| Profile | Code | Description |
|---------|------|-------------|
| 0x00000000 | 0x0000 | The server has processed the image query message 1206 and has an update for the software update client 1198. |
| 0x0000000C | 0x0001 | The server has processed the image query message 1206, but the server does not have an update for the software update client 1198. |
| 0x00000000 | 0x0010 | The server could not process the request because of improper form for the request. |
| 0x00000000 | 0x0020 | The server could not process the request due to an internal error | b. URI

Figure 28:
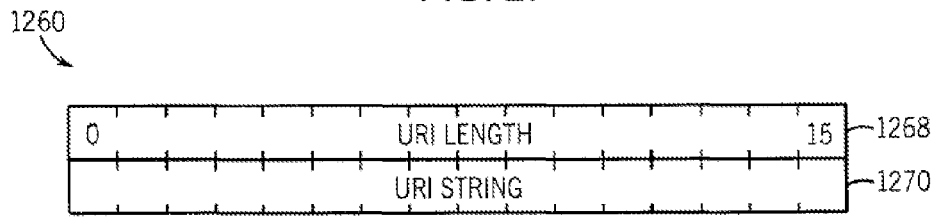
FIG. 28 illustrates a uniform resource identifier (URI) field of the image query response frame of FIG. 27, in accordance with an embodiment.

The URI field 1260 includes a variable number of bytes. The presence of the URI field 1260 may be determined by the query status field 1258. If the query status field 1258 indicates that an update is available, the URI field 1260 may be included. An embodiment of the URI field 1260 is illustrated in FIG. 28. The URI field 1260 includes two sub-fields: a URI length field 1268 and a URI string field 1270. The URI length field 1268 includes sixteen bits that indicates the length of the URI string field 1270 in UTF-8 characters. The URI string field 1270 and indicates the URI attribute of the software image update being presented, such that the software update client 1198 may be able to locate, download, and install a software image update, when present.

c. Integrity Specification

Figure 29:
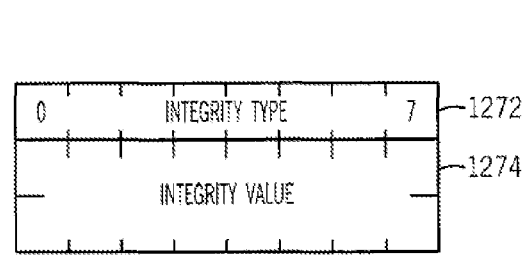
FIG. 29 illustrates a integrity specification field of the image query response frame of FIG. 27, in accordance with an embodiment.

The integrity specification field 1262 may variable in length and present when the query status field 1258 indicates that an update is available from the software update server 1198 to the software update client 1198. An embodiment of the integrity specification field 1262 is illustrated in FIG. 29. As illustrated, the integrity specification field 1262 includes two sub-fields: an integrity type field 1272 and an integrity value field 1274. The integrity type field 1272 includes eight bits that indicates an integrity type attribute for the software image update and may be populated using a list similar to that illustrated in Table 10 above. The integrity value field 1274 includes the integrity value that is used to verify that the image update message has maintained integrity during the transmission.

d. Update Scheme

The update scheme field 1264 includes eight bits and is present when the query status field 1258 indicates that an update is available from the software update server 1198 to the software update client 1198. If present, the update scheme field 1264 indicates a scheme attribute for the software update image being presented to the software update server 1198.

e. Update Options

Figure 30:
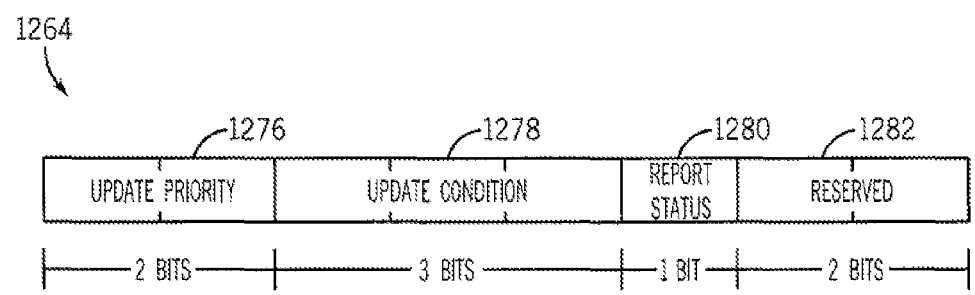
FIG. 30 illustrates an update scheme field of the image query response frame of FIG. 27, in accordance with an embodiment.

The update options field 1266 includes eight bits and is present when the query status field 1258 indicates that an update is available from the software update server 1198 to the software update client 1198. The update options field 1266 may be sub-divided as illustrated in FIG. 30. As illustrated, the update options field 1266 includes four sub-fields: an update priority field 1276, an update condition field 1278, a report status flag 1280, and a reserved field 1282. In some embodiments, the update priority field 1276 includes two bits. The update priority field 1276 indicates a priority attribute of the update and may be determined using values such as those illustrated in Table 13 below.

TABLE 13

Example update priority values

| Value | Description |
|---|---|
| 00 | Normal - update during a period of low network traffic |
| 01 | Critical - update as quickly as possible |

The update condition field 1278 includes three bits that may be used to determine conditional factors to determine when or if to update. For example, values in the update condition field 1278 may be decoded using the Table 14 below.

TABLE 14

Example update conditions

| Value | Decription |
|---|---|
| 0 | Update without conditions |
| 1 | Update if the version of the software running on the update client software does not match the update version. |
| 2 | Update if the version of the software running on the update client software is older than the update version. |
| 3 | Update if the user opts into an update with a user interface |

The report status flag 1280 is a single bit that indicates whether the software update client 1198 should respond with a download notify message 1210. If the report status flag 1280 is set to 1 the software update server 1198 is requesting a download notify message 1210 to be sent after the software update is downloaded by the software update client 1200.

If the image query response 1208 indicates that an update is available. The software update client 1198 downloads 1210 the update using the information included in the image query response 1208 at a time indicated in the image query response 1208.

5. Download Notify

After the update download 1210 is successfully completed or failed and the report status flag 1280 value is 1, the software update client 1198 may respond with the download notify message 1212. The download notify message 1210 may be formatted in accordance with the status reporting format discussed above. An example of status codes used in the download notify message 1212 is illustrated in Table 15 below.

TABLE 15

Example download notify status codes

| Profile | Code | Description |
|---|---|---|
| 0x00000000 | 0x0000 | The download has been completed, and integrity verified |
| 0x0000000C | 0x0020 | The download could not be completed due to faulty download instructions. |
| 0x0000000C | 0x0021 | The image query response message 1208 appears proper, but the download or integrity verification failed. |
| 0x0000000C | 0x0022 | The integrity of the download could not be verified. |

In addition to the status reporting described above, the download notify message 1208 may include additional status information that may be relevant to the download and/or failure to download.

6. Notify Response

The software update server 1200 may respond with a notify response message 1214 in response to the download notify message 1212 or an update notify message 1216. The notify response message 1214 may include the status reporting format, as described above. For example, the notify response message 1214 may include status codes as enumerated in Table 16 below.

TABLE 16

Example notify response status codes

| Profile | Code | Description |
|---|---|---|
| 0x00000000 | 0x0030 | Continue - the notification is acknowledged, but the update has not completed, such as download notify message 1214 received but update notify message 1216 has not. |
| 0x00000000 | 0x0000 | Success - the notification is acknowledged, and the update has completed. |
| 0x0000000C | 0x0023 | Abort - the notification is acknowledged, but the server cannot continue the update. |
| 0x0000000C | 0x0031 | Retry query - the notification is acknowledged, and the software update client 1198 is directed to retry the update by submitting another image query message 1206. |

In addition to the status reporting described above, the notify response message 1214 may include additional status information that may be relevant to the download, update, and/or failure to download/update the software update.

7. Update Notify

After the update is successfully completed or failed and the report status flag 1280 value is 1, the software update client 1198 may respond with the update notify message 1216. The update notify message 1216 may use the status reporting format described above. For example, the update notify message 1216 may include status codes as enumerated in Table 17 below.

TABLE 17

Example update notify status codes

| Profile | Code | Description |
|---|---|---|
| 0x00000000 | 0x0000 | Success - the update has been completed. |
| 0x0000000C | 0x0010 | Client error - the update failed due to a problem in the software update client 1198. |

In addition to the status reporting described above, the update notify message 1216 may include additional status information that may be relevant to the update and/or failure to update.

C. Bulk Transfer

In some embodiments, it may be desirable to transfer bulk data files (e.g., sensor data, logs, or update images) between nodes/services in the fabric 1000. To enable transfer of bulk data, a separate profile or protocol may be incorporated into one or more profiles and made available to the nodes/services in the nodes. The bulk data transfer protocol may model data files as collections of data with metadata attachments. In certain embodiments, the data may be opaque, but the metadata may be used to determine whether to proceed with a requested file transfer.

Figure 31:
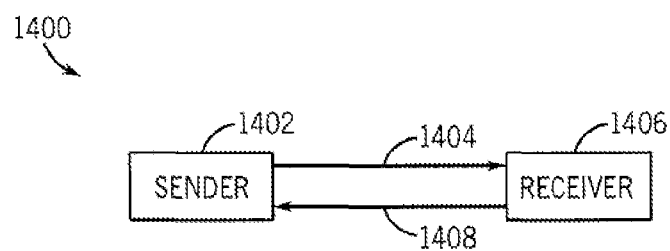
FIG. 31 illustrates a communicative connection between a sender and a receiver in a bulk data transfer, in accordance with an embodiment.

Devices participating in a bulk transfer may be generally divided according to the bulk transfer communication and event creation. As illustrated in FIG. 31, each communication 1400 in a bulk transfer includes a sender 1402 that is a node/service that sends the bulk data 1404 to a receiver 1406 that is a node/service that receives the bulk data 1404. In some embodiments, the receiver may send status information 1408 to the sender 1402 indicating a status of the bulk transfer. Additionally, a bulk transfer event may be initiated by either the sender 1402 (e.g., upload) or the receiver 1406 (e.g., download) as the initiator. A node/service that responds to the initiator may be referred to as the responder in the bulk data transfer.

Bulk data transfer may occur using either synchronous or asynchronous modes. The mode in which the data is transferred may be determined using a variety of factors, such as the underlying protocol (e.g., UDP or TCP) on which the bulk data is sent. In connectionless protocols (e.g., UDP), bulk data may be transferred using a synchronous mode that allows one of the nodes/services ("the driver") to control a rate at which the transfer proceeds. In certain embodiments, after each message in a synchronous mode bulk data transfer, an acknowledgment may be sent before sending the next message in the bulk data transfer. The driver may be the sender 1402 or the receiver 1406. In some embodiments, the driver may toggle between an online state and an offline mode while sending messages to advance the transfer when in the online state. In bulk data transfers using connection-oriented protocols (e.g., TCP), bulk data may be transferred using an asynchronous mode that does not use an acknowledgment before sending successive messages or a single driver.

Regardless of whether the bulk data transfer is performed using a synchronous or asynchronous mode, a type of message may be determined using a Message Type 1172 in the Application Payload 1146 according the Profile Id 1176 in the Application Payload. Table 18 includes an example of message types that may be used in relation to a bulk data transfer profile value in the Profile Id 1176.

TABLE 18

Example of profile message types for bulk data transfer profiles

| Type | Message |
| --- | --- |
| 0x01 | snapshot request |
| 0x02 | watch request |
| 0x03 | periodic update request |
| 0x04 | refresh update |
| 0x05 | cancel view update |
| 0x06 | view response |
| 0x07 | explicit update request |
| 0x08 | view update request |
| 0x09 | Block EOF |
| 0x0A | Ack |
| 0x0B | Block EOF |
| 0x0C | Error | i. SendInit

Figure 32:
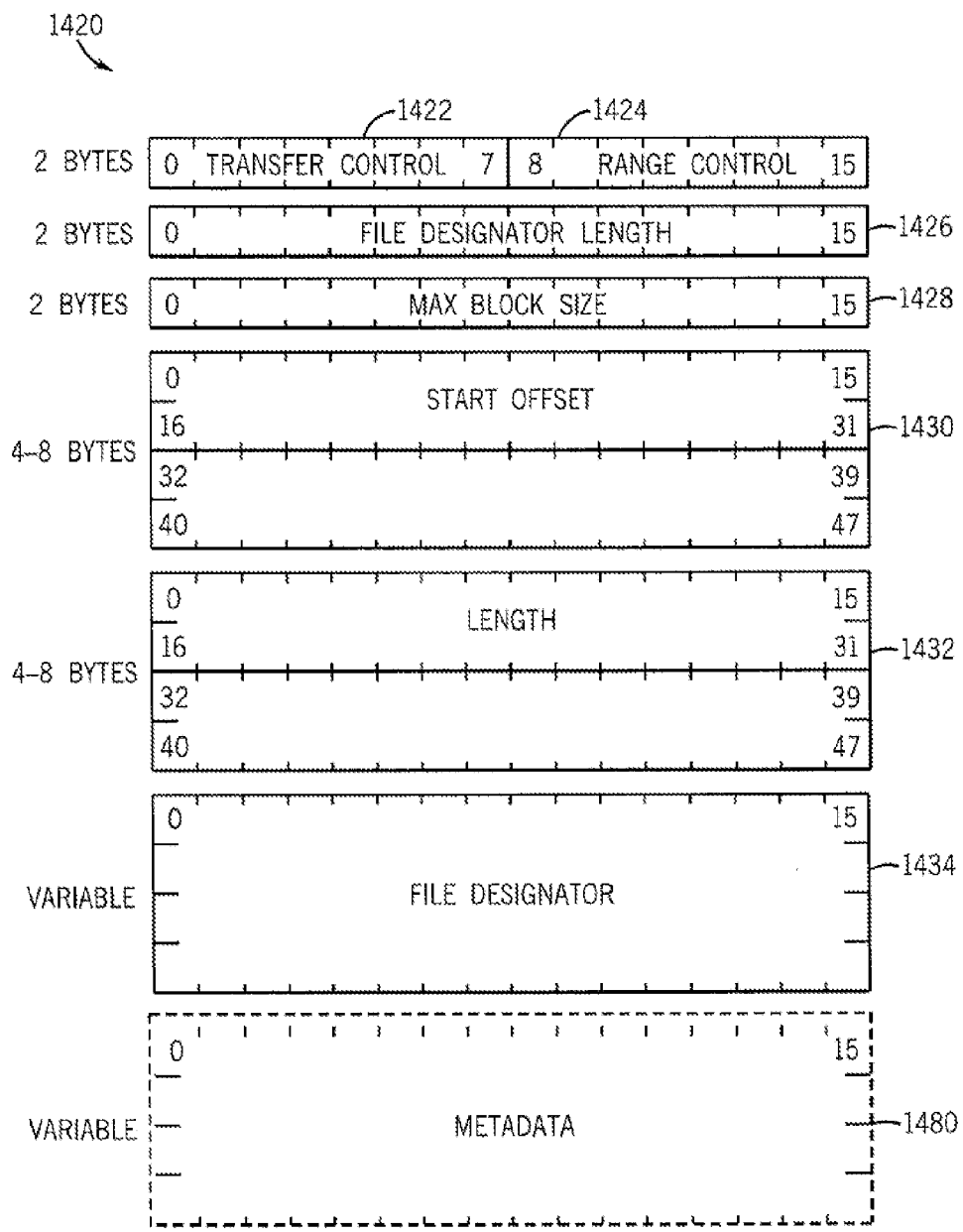
FIG. 32 illustrates a SendInit message that may be used to initiate the communicative connection by the sender of FIG. 31, in accordance with an embodiment.

An embodiment of a SendInit message 1420 is illustrated in FIG. 32. The SendInit message 1420 may include seven fields: a transfer control field 1422, a range control field 1424, a file designator length field 1426, a proposed max block size field 1428, a start offset field 1430, length field 1432, and a file designator field 1434.

Figure 33:
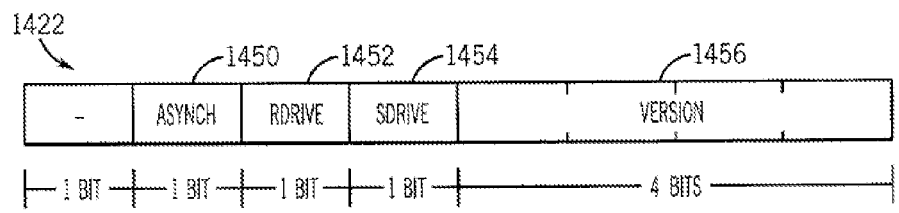
FIG. 33 illustrates a transfer control field of the SendInit message of FIG. 32, in accordance with an embodiment.

The transfer control field 1422 includes a byte of data illustrated in FIG. 33. The transfer control field includes at least four fields: an Asynch flag 1450, an RDrive flag 1452, an SDrive flag 1454, and a version field 1456. The Asynch flag 1450 indicates whether the proposed transfer may be performed using a synchronous or an asynchronous mode. The RDrive flag 1452 and the SDrive flag 1454 each respectively indicates whether the receiver 1406 is capable of transferring data with the receiver 1402 or the sender 1408 driving a synchronous mode transfer.

Figure 34:
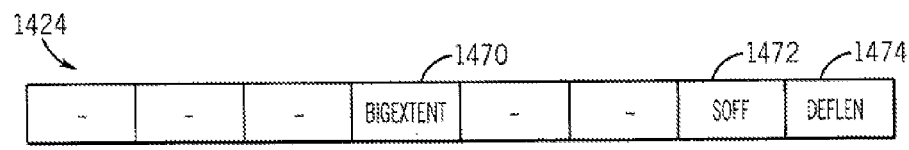
FIG. 34 illustrates a range control field of the SendInit message of FIG. 33, in accordance with an embodiment.

The range control field 1424 includes a byte of data such as the range control field 1424 illustrated in FIG. 34. In the illustrated embodiment, the range control field 1424 includes at least three fields: a BigExtent flag 1470, a start offset flag 1472, and a definite length flag 1474. The definite length flag 1474 indicates whether the transfer has a definite length. The definite length flag 1474 indicates whether the length field 1432 is present in the SendInit message 1420, and the BigExtent flag 1470 indicates a size for the length field 1432. For example, in some embodiments, a value of 1 in the BigExtent flag 1470 indicates that the length field 1432 is eight bytes. Otherwise, the length field 1432 is four bytes, when present. If the transfer has a definite length, the start offset flag 1472 indicates whether a start offset is present. If a start offset is present, the BigExtent flag 1470 indicates a length for the start offset field 1430. For example, in some embodiments, a value of 1 in the BigExtent flag 1470 indicates that the start offset field 1430 is eight bytes. Otherwise, the start offset field 1430 is four bytes, when present.

Returning to FIG. 32, the file designator length field 1426 includes two bytes that indicate a length of the file designator field 1434. The file designator field 1434 which is a variable length field dependent upon the file designator length field 1426. The max block size field 1428 proposes a maximum size of block that may be transferred in a single transfer.

The start offset field 1430, when present, has a length indicated by the BigExtent flag 1470. The value of the start offset field 1430 indicates a location within the file to be transferred from which the sender 1402 may start the transfer, essentially allowing large file transfers to be segmented into multiple bulk transfer sessions.

The length field 1432, when present, indicates a length of the file to be transferred if the definite length field 1474 indicates that the file has a definite length. In some embodiments, if the receiver 1402 receives a final block before the length is achieved, the receiver may consider the transfer failed and report an error as discussed below.

The file designator field 1434 is a variable length identifier chosen by the sender 1402 to identify the file to be sent. In some embodiments, the sender 1402 and the receiver 1406 may negotiate the identifier for the file prior to transmittal. In other embodiments, the receiver 1406 may use metadata along with the file designator field 1434 to determine whether to accept the transfer and how to handle the data. The length of the file designator field 1434 may be determined from the file designator length field 1426. In some embodiments, the SendInit message 1420 may also include a metadata field 1480 of a variable length encoded in a TLV format. The metadata field 1480 enables the initiator to send additional information, such as application-specific information about the file to be transferred. In some embodiments, the metadata field 1480 may be used to avoid negotiating the file designator field 1434 prior to the bulk data transfer.

ii. SendAccept

Figure 35:
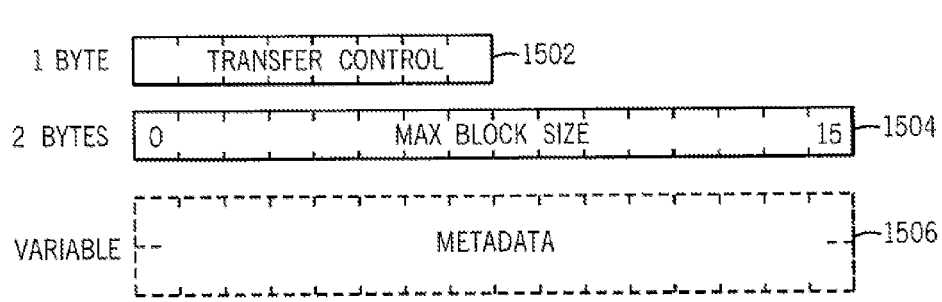
FIG. 35 illustrates a SendAccept message that may be used to accept a communicative connection proposed by the SendInit message of FIG. 32 sent by the sender of FIG. 32, in accordance with an embodiment.

A send accept message is transmitted from the responder to indicate the transfer mode chosen for the transfer. An embodiment of a SendAccept message 1500 is presented in FIG. 35. The SendAccept message 1500 includes a transfer control field 1502 similar to the transfer control field 1422 of the SendInit message 1420. However, in some embodiments, only the RDrive flag 1452 or the SDrive flag 1454 may have a nonzero value in the transfer control field 1502 to identify the sender 1402 or the receiver 1406 as the driver of a synchronous mode transfer. The SendAccept message 1500 also includes a max block size field 1504 that indicates a maximum block size for the transfer. The block size field 1504 may be equal to the value of the max block field 1428 of the SendInit message 1420, but the value of the max block size field 1504 may be smaller than the value proposed in the max block field 1428. Finally, the SendAccept message 1500 may include a metadata field 1506 that indicates information that the receiver 1506 may pass to the sender 1402 about the transfer.

iii. SendReject

Figure 36:
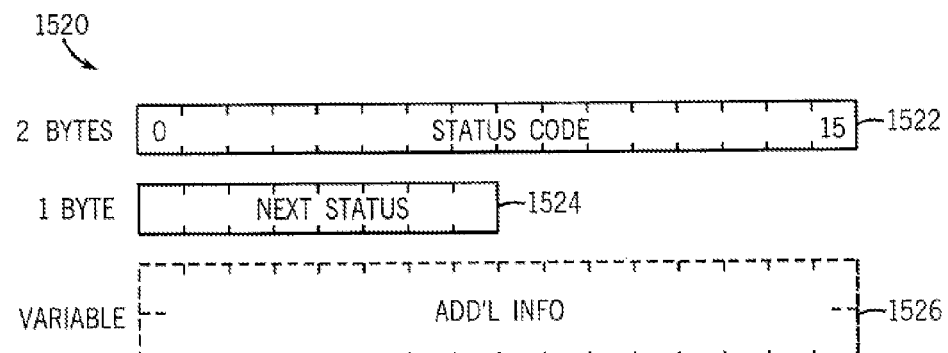
FIG. 36 illustrates a SendReject message that may be used to reject a communicative connection proposed by the SendInit message of FIG. 32 sent by the sender of FIG. 32, in accordance with an embodiment.

When the receiver 1206 rejects a transfer after a SendInit message, the receiver 1206 may send a SendReject message that indicates that one or more issues exist regarding the bulk data transfer between the sender 1202 and the receiver 1206. The send reject message may be formatted according to the status reporting format described above and illustrated in FIG. 36. A send reject frame 1520 may include a status code field 1522 that includes two bytes that indicate a reason for rejecting the transfer. The status code field 1522 may be decoded using values similar to those enumerated as indicated in the Table 19 below.

TABLE 19

Example status codes for send reject message

| Status Code | Description |
| --- | --- |
| 0x0020 | Transfer method not supported |
| 0x0021 | File designator unknown |
| 0x0022 | Start offset not supported |
| 0x0011 | Length required |
| 0x0012 | Length too large |
| 0x002F | Unknown error |

In some embodiments, the send reject message 1520 may include a next status field 1524. The next status field 1524, when present, may be formatted and encoded as discussed above in regard to the next status field 1188 of a status report frame. In certain embodiments, the send reject message 1520 may include an additional information field 1526. The additional information field 1526, when present, may store information about an additional status and may be encoded using the TLV format discussed above.

iv. ReceiveInit

A ReceiveInit message may be transmitted by the receiver 1206 as the initiator. The ReceiveInit message may be formatted and encoded similar to the SendInit message 1480 illustrated in FIG. 32, but the BigExtent field 1470 may be referred to as a maximum length field that specifies the maximum file size that the receiver 1206 can handle.

v. ReceiveAccept

Figure 37:
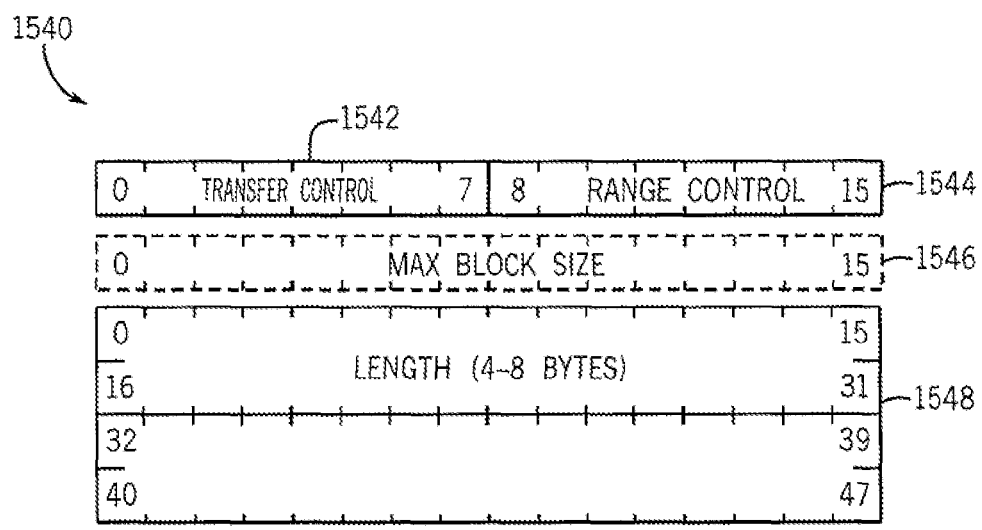
FIG. 37 illustrates a ReceiveAccept message that may be used to accept a communicative connection proposed by the receiver of FIG. 32, in accordance with an embodiment.

When the sender 1202 receives a ReceiveInit message, the sender 1202 may respond with a ReceiveAccept message. The ReceiveAccept message may be formatted and encoded as the ReceiveAccept message 1540 illustrated in FIG. 37. The ReceiveAccept message 1540 may include four fields: a transfer control field 1542, a range control field 1544, a max block size field 1546, and sometimes a length field 1548. The ReceiveAccept message 1540 may be formatted similar to the SendAccept message 1502 of FIG. 35 with the second byte indicating the range control field 1544. Furthermore, the range control field 1544 may be formatted and encoded using the same methods discussed above regarding the range control field 1424 of FIG. 34.

vi. ReceiveReject

If the sender 1202 encounters an issue with transferring the file to the receiver 1206, the sender 1202 may send a ReceiveReject message formatted and encoded similar to a SendReject message 48 using the status reporting format, both discussed above. However, the status code field 1522 may be encoded/decoded using values similar to those enumerated as indicated in the Table 20 below.

TABLE 20

Example status codes for receive reject message

| Status Code | Description |
| --- | --- |
| 0x0020 | Transfer method not supported |
| 0x0021 | File designator unknown |
| 0x0022 | Start offset not supported |
| 0x0013 | Length too short |
| 0x002F | Unknown error | vii. BlockQuery

A BlockQuery message may be sent by a driving receiver 1202 in a synchronous mode bulk data transfer to request the next block of data. A BlockQuery impliedly acknowledges receipt of a previous block of data if not explicit Acknowledgement has been sent. In embodiments using asynchronous transfers, a BlockQuery message may be omitted from the transmission process.

viii. Block

Blocks of data transmitted in a bulk data transfer may include any length greater than 0 and less than a max block size agreed upon by the sender 1202 and the receiver 1206.

ix. BlockEOF

A final block in a data transfer may be presented as a Block end of file (BlockEOF). The BlockEOF may have a length between 0 and the max block size. If the receiver 1206 finds a discrepancy between a pre-negotiated file size (e.g., length field 1432) and the amount of data actually transferred, the receiver 1206 may send an Error message indicating the failure, as discussed below.

x. Ack

If the sender 1202 is driving a synchronous mode transfer, the sender 1202 may wait until receiving an acknowledgment (Ack) after sending a Block before sending the next Block. If the receiver is driving a synchronous mode transfer, the receiver 1206 may send either an explicit Ack or a BlockQuery to acknowledge receipt of the previous block. Furthermore, in asynchronous mode bulk transfers, the Ack message may be omitted from the transmission process altogether.

xi. AckEOF

An acknowledgement of an end of file (AckEOF) may be sent in bulk transfers sent in synchronous mode or asynchronous mode. Using the AckEOF the receiver 1206 indicates that all data in the transfer has been received and signals the end of the bulk data transfer session.

xii. Error

In the occurrence of certain issues in the communication, the sender 1202 or the receiver 1206 may send an error message to prematurely end the bulk data transfer session. Error messages may be formatted and encoded according to the status reporting format discussed above. For example, an error message may be formatted similar to the SendReject frame 1520 of FIG. 36. However, the status codes may be encoded/decoded with values including and/or similar to those enumerated in Table 21 below.

TABLE 21

Example status codes for an error message
in a bulk data transfer profile

| Status code | Description |
| --- | --- |
| 0x001F | Transfer failed unknown error |
| 0x0011 | Overflow error |

D. Locale Profile

Using the locale profile, smart devices may present supported localizations to other devices in the mesh network. Specifically, the locale profile enables smart devices to specify which locations and languages are supported in a specific format recognizable by other devices in the network. In some embodiments, any communication using the locale profile may be identified using a profile ID. For example, in some embodiments, the profile ID for the locale profile may be 0x0000 0011. Any communication tagged with the locale profile ID may be interpreted as a locale identifier organized in a format that is mutually understood by other devices in the network. Moreover, in some embodiments, the bits of data in the profile may be formatted in a big endian or little endian. Furthermore, in some embodiments, the locale profile may be instanced for each device using a node identifier as a unique identifier for each respective device in the network.

E. Alarm Profile

When a hazard detector or other status-determining device changes state, that state change may be communicated to the other devices on the network. The state changes from the originating device may be signaled to an alarming state machine on the remote nodes (e.g., thermostats), and taken as inputs into the different state transitions. In addition, the remote node may request different state changes from the originating node (e.g., the hazard detector), and the originating node can accept or reject the state change. The state transmissions may include alarm propagations, remote hushes of alarms, and alarm handling, among other transmissions. For example, propagation of the alarm through various states, from different "Heads Up" pre-alarm states, to a hushable alarm, to a non-hushable alarm, and to a standby mode. In some embodiments, the alarm conditions may change over time, as different sensors in one or more devices in a fabric may trigger an alarm.

Additionally, a remote hush occurs when a remote node is hushed locally by some interaction. In such cases, the remote hush propagates an update to the originating node, and depending on the policies, that update may result in a hush request being propagated to other remotes ("global hush"). Moreover, in some embodiments, alarms from different originating nodes may be treated differently. The different devices within the network may be aware of the different originating alarms, and, the policies may allow the alarm to be hushed at originating device by one device or type but not by another device or type. In some embodiments, the alarm may be propagated the other devices of the same type, the service, and any clients that are participating in the network.

In some embodiments, the originating device is responsible for changing the global state of the alarm. In such cases, the alarm updates are propagated from a remote device to the originating device, where they are processed and either accepted (and propagated to the rest of the network) or rejected. The policy for changing the global state of the alarm may be specific to the alarm, deployment locale, and possibly other factors and may be handled by application layer.

An application interface provides an interface to initiate an alarm, hush an alarm and receive various updates. The application interfaces with that layer, and implements local policy rules for hushing, etc. Protocol and message specifications provide a framework for disseminating alarms to the entire network and specify message formats and message exchange patterns. In a case of an alarm, the network stops being sleepy, and the nodes in the network become active. However, waking up the network from and propagating the detailed alarm are separate functions that may be performed independently.

a. Terms

Alarm originator as used herein refers to a device that originates the alarm. There may be multiple alarm originators devices within a single network or fabric. Alarm remote, as used herein, refers to a device that is not the originating device and receives an alarm message. A device can simultaneously be an alarm remote for one alarm and an originating node for another alarm. For example, if two hazard detectors detect a hazard condition, both hazard detectors may originate an alarm and receive another alarm.

Alarm source, as used herein, refers to a sensor or condition that triggered the alarm. Global hush, as used herein, refers to an alarm that is hushed at both the alarm originator and the alarm remotes. Hush, as used herein, refers to a silenced alarm that is set to disable re-arming for a period of time. Remote hush, as used herein, refers to an alarm that is hushed at all the remote devices, but the originating device is still alarming. Pre-alarms, as used herein, refers states of the alarming state machine that may causes the remote device to arm enter a higher wakefulness state. For example, when a hazard detector detects that levels are approaching an alarm level.

b. Message Types

In some embodiments, alarm messages may have some information that is consistent between at least some of the alarm message types. For example, the alarm originator may be identified using a NodeID, such as a 64-bit ID that is unique for the device on the network. Moreover, a WhereID may be an extended 128-bit ID of the location of the alarm originator. AlarmCtr may be an 8-bit alarm version counter that is used to communicate that an alarm state has been updated. An initial alarm may start with an AlarmCtr of 0, and each update of alarm state (as determined by the originating node) may increment the AlarmCtr counter. A change in the AlarmCtr may be signalled locally to the application at each remote node. Throughout the network, the combination of the AlarmCtr and originating node id form a unique tuple that causes a particular action on a receiving node. After an alarm has been resolved at the alarm originator, the AlarmCtr may restart at 0 on a subsequent, distinct alarm condition.

The alarm profile defines the following numeric message types in Table 22:

TABLE 22

Alarm profile message types

| Message Type | Message |
| --- | --- |
| 0x01 | Alarm Message |
| 0x02 | AlarmUpdate |
| 0x03 | AlarmAck |

Figure 38:
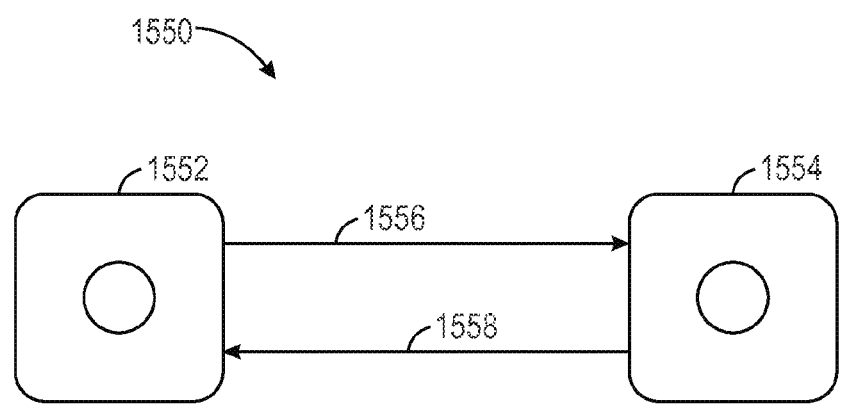
FIG. 38 illustrates an alarm propagation between various smart devices using an alarm profile, in accordance with an embodiment.

The protocol has a number of fields, such as an alarm condition. FIG. 38 illustrates a schematic view of an embodiment of an alarm message interaction 1550. As illustrated, a sending device 1552 sends an alarm message 1556 to a receiving device 1554. In some embodiments, the receiving device 1554 sends an alarm acknowledgment 1558. For example, in some embodiments, the receiving device 1554 may send the alarm acknowledgment 1558 when the alarm message 1552 is unicast and addressed to the receiving device 1554. However, in certain embodiments, the receiving device 1554 may omit an alarm acknowledgment 1558 when the alarm message 1556 is multicast among devices. In some embodiments, the alarm condition may be an 8-bit value, where the 4 most significant bits determine the alarm source and the lower 4 bits determine the alarm state. In certain embodiments, the alarm source may be populated using one of the following values reproduced in Table 23:

TABLE 23

Alarm sources

| Value | Name | Comments |
|---|---|---|
| 0x10 | ALARM_SMOKE | Alarm triggered by the smoke sensor |
| 0x20 | ALARM_TEMP | Alarm triggered by the temperature sensor |
| 0x30 | ALARM_CO | Alarm triggered by the CO sensor |
| 0x40 | ALARM_CH4 | Alarm triggered by the natural gas sensor |
| 0x50 | ALARM_HUMIDITY | Alarm triggered by the humidity sensor |
| 0x60 | ALARM_SECURITY | Security Alarm |
| 0x70..0xe0 | | Reserved for future use |
| 0xf0 | ALARM_OTHER | Other alarm condition not called out here. Check the TLV metadata for the specific alarm source. |

Similarly, alarm state may be populated using the following values reproduced in Table 24:

TABLE 24

Alarm states

| Value | Name | Comments |
|---|---|---|
| 0x00 | STATE_STANDBY | Everything is OK. Originating node will send this to indicate an "all clear" for the specific alarm source |
| 0x01 | STATE_HEAD_UP_1 | Pre-alarm state |
| 0x02 | STATE_HEAD_UP_2 | Pre-alarm state |
| 0x03 | STATE_HU_HUSH | Pre-alarm state |
| 0x04 | STATE_ALARM_HUSHABLE | Alarm state, the originating or remote node may locally hush the alarm |
| 0x05 | STATE_ALARM_NONHUSHABLE | Originating alarms may not be hushed, but remote alarms may hush |
| 0x06 | STATE_ALARM_GLOBAL_HUSH | he originating and the remote nodes are in the hush state |
| 0x07 | STATE_ALARM_REMOTE_HUSH | The originating node is alarming and the remote nodes are hushed |
| 0x08 | STATE_SELFTEST | Selftest of the sensor alarm |

AlarmUpdateStatus may be populated as an 8-bit integer to indicate the status of an alarm update request using the following values reproduced in Table 25:

TABLE 25

AlarmUpdateStatus

| Value | Meaning |
|---|---|
| 0 | SUCCESS |
| 1 | REJECTED_BY_POLICY |
| 2 | INVALID_STATE | i. Alarm Message

Alarm messages may be either multicast or unicast. The message may be periodically re-sent as long as the alarm condition is ongoing in the multicast and/or unicast case. The alarm originator may update the alarm state at any point with those changes being propagated. In some embodiments, in a steady state (e.g., the alarm state is not changing), the message may be re-disseminated to the network at a rate higher than the alarm expiration. An alarm message may include the following information reproduced in Table 26.

TABLE 26

Alarm message fields

| Name | Size | Note |
|---|---|---|
| AlarmCtr | 1 byte | Alarm version counter |
| AlarmLen | 1 byte | Number of different AlarmConditions triggering this alarm |
| AlarmConditions | variable | An array of AlarmConditions |
| Where ID | 1-16 bytes | The WhereID of the originating node |
| Metadata | variable | TLV data |

In some embodiments, one or more of the data fields may vary in size from the above values. If the alarm source is not present in the list of AlarmConditions, the remote node may assume that the alarm state for that sensor is STATE_STANDBY. In some embodiments, when the alarm message includes a correctly set counter and the AlarmLen set to 0 and AlarmConditions omitted, the message may be interpreted as an "All Clear" signal. In some embodiments, the AlarmConditions may include an alarm type and severity of the alarm. In certain embodiments, additional information may be included in TLV data, such as authorization keys or other pertinent information to the network.

ii. Alarm Update Message

Alarm Update messages may be sent from alarm remotes to the alarm originator to update the alarm state. For example, an alarm update message may be used as a request for status change (such as to request a remote hush or to change the alarming bits) or an update to other pertinent metadata (remote readings, etc). An alarm update message may be populated using a structure similar to the data reproduced in Table 27 below:

TABLE 27

Alarm update message.

| Name | Size | Note |
| --- | --- | --- |
| AlarmCtr | 1 byte | Alarm version counter (the version of the alarm that is requested to change) |
| AlarmLen | 1 byte | Number of Alarm Conditions to update |
| AlarmConditions | variable | AlarmConditions to be updated |
| Metadata | variable | TLV data |

Using an AlarmUpdate, the alarm remote requests changes to the state of the ongoing alarm. Each of the AlarmConditions elements contains the desired state for a specific alarm source. If an AlarmCondition is not present in the list, the originating node assumes that there is no status change request made for that sensor.

iii. Alarm Acknowledgement Message

An alarm acknowledgement message is a unicast message that serves as an acknowledgement for the unicast scenarios such as alarm update. The message includes fields used to identify the message that is being acknowledged such as those included in Table 28 below:

TABLE 28

Alarm acknowledgement message.

| Name | Size | Note |
| --- | --- | --- |
| AlarmCtr | 1 byte | Alarm version counter (equal to the AlarmCtr from the AlarmUpdate message) |
| AlarmUpdateStatus | 1 byte | Status of the update: the originating nodes pecifies whether the update request has been successful or not. |
| AlarmLen | 1 byte | If update was rejected, this field would contain the length of AlarmConditions |
| AlarmConditions | Variable | If the update was rejected, the originating node may specify the desired state on the remote. | c. Multicast Alarms

Figure 39:
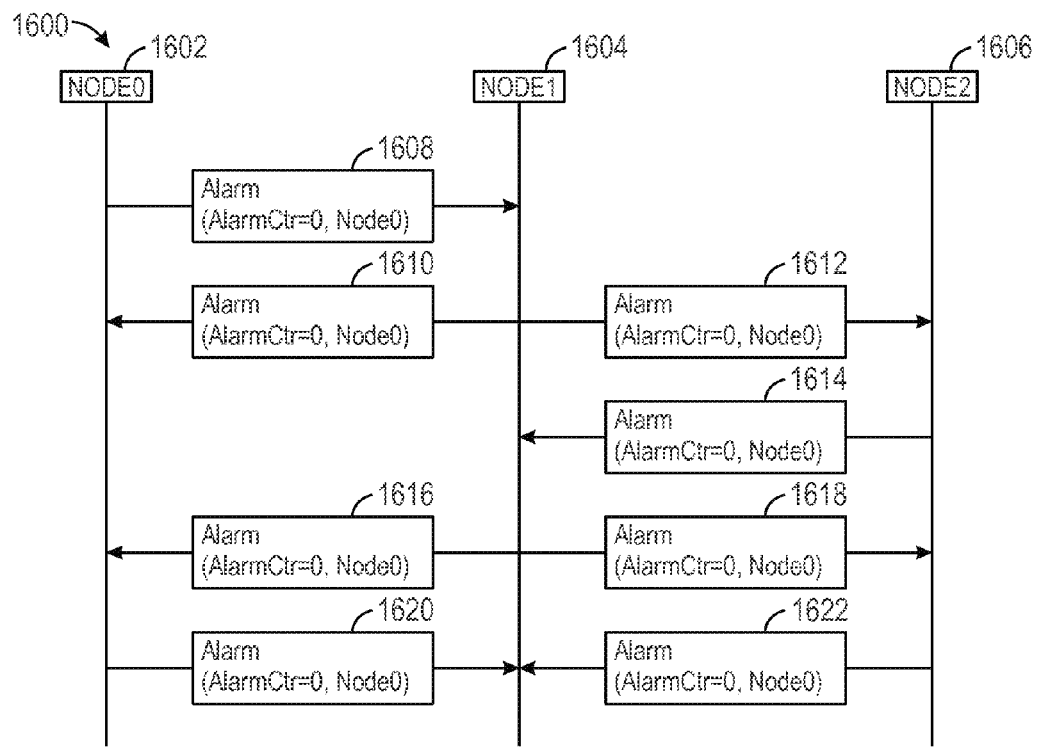
FIG. 39 illustrates an alarm profile message distribution between three devices in a smart network using multicast distribution, in accordance with an embodiment.

FIG. 39 illustrates a broadcast pattern 1600 where an alarm is broadcast to the entire network from an originating node, Node0 1602, and remote nodes, Node1 1604 and Node2 1606. An alarm message 1608 starts at the originating node, and propagates to its locally-connected neighbor Node1 1604 as alarm messages 1608. Node1 1602 uses a timer to determine how long after receiving a message to propagate the alarm. After the time expires, Node1 1602 then propagates the message 1608 contents to all connected neighbors, Node1 1604 and Node2 1606, as the alarm messages 1610 and 1612, respectively. Node2 1606 then propagates the alarm content as alarm message 1614 to all connected neighbors (e.g., Node1 1604). Node1 1604 then propagates the alarm as alarm messages 1616 and 1618 to Node0 1602 and Node1 1604. With a broadcasting dissemination with each node having a threshold of 2 may result in the broadcast pattern 1600 of FIG. 39. If the number is higher, each device may attempt to propagate more times, but if the number is lower, the propagation may cease sooner with each device propagating the alarm fewer times.

In some embodiments, the multicast alarm is re-sent periodically as long as the alarm condition is active. The resend rate is a function of the underlying configuration of the broadcast dissemination. In some embodiments, the resend rate may be approximately on the order of the broadcast message expiration time T.

When the alarm state changes, the originating node increments the AlarmCtr, and sends out a new broadcast message (with a new broadcast ID). By sending out a new broadcast message, the originating node (e.g., Node0 1602) resets the internal timers, and starts fast message propagation through the network.

d. Unicast Alarms

Figure 40:
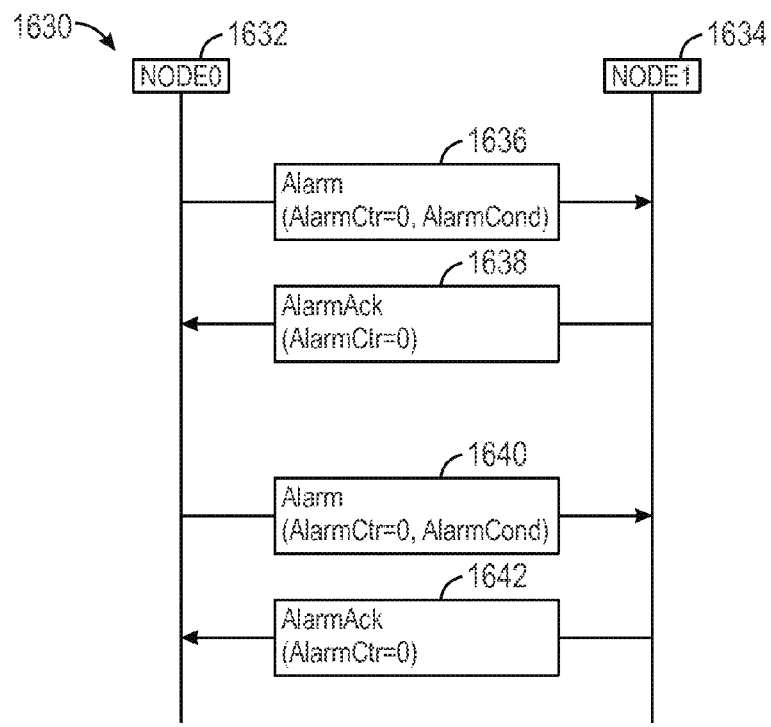
FIG. 40 illustrates an alarm profile message distribution for a unicast message between two devices in a smart network, in accordance with an embodiment.

Unicast alarms are targeted to a specific endpoint. Unicast alarms are slightly different from multicast alarms, in that they may not account for network density, and may not rely on intermediate nodes to keep any additional state. Unicast alarms utilize AlarmAck messages to turn down the message rates to a relatively lower rate. FIG. 40 shows an example message distribution 1640. As shown in FIG. 40, two nodes are present, Node0 1632 and Node1 1634, where Node0 1632 is an originating node and Node1 1634 is a remote node that the alarm message is designated to reach. FIG. 40 illustrates steady state alarming with no changes to the alarms. Specifically, an alarm message 1636 is sent from Node0 1632 to Node1 1634 with a list of alarm conditions. Node1 1634 responds with an alarm acknowledgment message 1638 with the same AlarmCtr. At some later time, Node0 1632 sends another alarm message 1640 indicating a set of alarm conditions. Again, Node1 1634 responds with an alarm acknowledgment message 1640. The alarm conditions for the alarm messages 1636 and 1640 indicate that no changes have been made to the alarm by Node0 1632.

Figure 41:
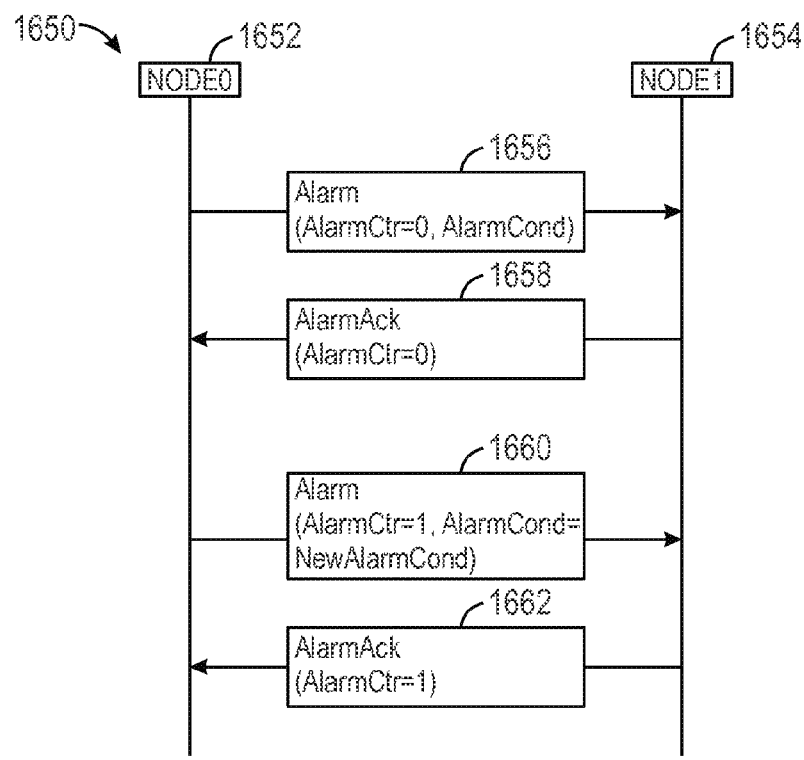
FIG. 41 illustrates an alarm profile message distribution for a unicast message between two devices in a smart network when an alarm condition changes at an originating device, in accordance with an embodiment.

FIG. 41 illustrates a message distribution 1650 when an alarm state change occurs at the originator. Similar to FIG. 40, the originator node 1652 sends an alarm message 1656 to a remote node 1654. The remote node 1654 responds with an alarm acknowledgment message 1658. Some change (e.g., temperature change) occurs at the originating node 1652, and the originating node 1654 responds with a new alarm message 1660 with an indication of a status change with a change in the AlarmCtr and new alarm conditions. Again, the remote node 1654 responds with an alarm acknowledgment message 1662.

Figure 42:
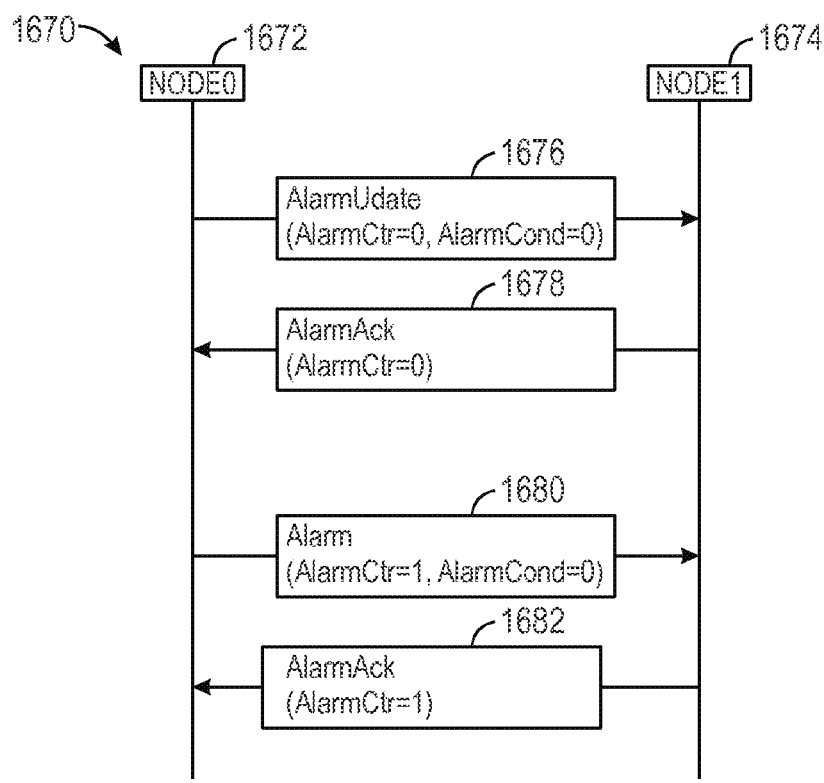
FIG. 42 illustrates an alarm profile message distribution for a unicast message between two devices in a smart network when a remote device sends an alarm update message, in accordance with an embodiment.

FIG. 42 illustrates a message distribution 1670 where a remote node 1674 request to update alarm state where the remote node 1674 requests the originator node 1672 to hush the alarm and the originator accepts. The remote node 1674 sends an originator node 1672 an alarm update message 1676. The originator node 1672 responds with an acknowledgment message 1678. Once the alarm has been acted upon (e.g., hushed), the originator node 1672 sends an alarm message that indicates that the alarm status has changed using an AlarmCtr change. Furthermore, a value of 0 for the alarm conditions indicate that the alarm is hushed.

Moreover, in some embodiments, in the unicast case, the originator node is done with the alarm as soon as it receives an acknowledgement to the message that indicated alarm hushing (AlarmCond=0) or T0 timeout is reached.

e. TLV tags

The profile may be primarily concerned with the general type of alarm and the state of the alarm as it propagates through the network. Additional alarm specific data may also be packed into a TLV section of the alarm message. Some sample parameters that might be present in the TLV data may be the time of the alarm along with the appropriate time base, the reading of the alarming sensor, and auxiliary sensor readings. The profile also allows for an implementation of a stateful alarm that expects that the notifications about the alarm state are propagated to an application program without loss, and exactly once.

f. Sample Scenarios

The updates allow for a remote node to issue an update and leave the policy of how the update affects the alarm to the originating node. This allows for implementations of remote hushing (or for preventing such actions).

While the specifics of how the application chooses to handle the different alarm scenarios (the application is the view, while this profile provides a model), below are some sample scenarios of how different scenarios might be handled. In some embodiments, alarm sounds may be decomposed by a tuple of (severity, type, location); the notification for multiple originators and alarm conditions can be derived by lexicographic ordering of all the known conditions.

Single alarm originator, multiple alarm causes:
- Alarming: the alarm originator sends out alarm messages as the alarm conditions change. The alarm remotes modify the alarm sequence as the conditions evolve. The remote alarms play the appropriate message that is the result of interpretting the set of alarm conditions. In some embodiments, the playback may be subject to regulatory policy and timing constraints. In some embodiments, the most severe condition would be prioritized for playing. In some embodiments, all conditions that meet a predetermined severity are played. In certain embodiments, the remote alarms also play the location on the originating alarm.
- Local hush: on hush condition at the originator, the alarm originator sends out the alarm message with the state for each alarm set to STATE_ALARM_GLOBAL_HUSH. On reception of the message, the remote alarms enter hush state.
- Remote hush: at the remote alarm, a hush request is initiated. The node sends out an AlarmUpdate to the alarm originator with the STATE_ALARM_GLOBAL_HUSH bit set for all AlarmConditions. The alarm originator acknowledges the message. The acknowledgement carries with it information whether the requested state was permitted or disallowed. If the state was disallowed, an indication of a reason if given (e.g. disallowed by regulatory policy) is included in the acknowledgment. If the remote hush request was accepted, the alarm originator increases the sequence number. Then, if permitted by policy, the originator changes the state of the alarm conditions asked in the request. When the alarm may not be hushed on the originator but is permitted to be hushed on the remote alarms, the alarm state is set to STATE_ALARM_REMOTE_HUSH. The originator then proceeds to send out the alarm messages as previously described. Upon receipt of the new alarm state, remote alarms enter the hush state Multiple alarm originators, single alarm cause:
- Alarming: Each alarm originator sends out an alarm message, with the AlarmCondition set to the alarm cause. Because there is only a single common cause of the alarm, each alarm originator sets the same cause in their alarm messages. Each node in the network (both the nodes that are remote nodes as well as those that originated the alarms) tracks the known AlarmConditions. Each node independently combines the alarm conditions from all the alarm originators. The choice of alarm to be played is a straightforward one: there is only a single alarm condition. If timing constrainsts permit, the list of locations is played as well. If timing constrainsts do not permit the location of the alarm to be played, the location may be omitted or a special phrase may be inserted to indicate that the alarm originated in multiple places.
- Local hush: on hush condition at the one the originators, the respective originator node increments the AlarmCtr field and sends out the alarm message with the state set to STATE_ALARM_GLOBAL_HUSH. Additionally, it sends AlarmUpdate requests to each of the other active originators, the requested state is STATE_ALARM_GLOBAL_HUSH. Each of the other originators acts independently on the reception of the AlarmUpdate message: each originator accepts or rejects the update (according to policy), updates its AlarmCtr, and sends out the new state. If permitted by policy, all originators accept the STATE_ALARM_GLOBAL_HUSH. When each of the nodes (both originating alarm and acting as remote alarms) receives update from all originators stating that the respective originating alarm is now STATE_ALARM_GLOBAL_HUSH, the node plays back the message "Alarm hushed" and enters the hushed state.
- Remote hush: at the remote alarm, a hush state is initiated. The remote node sends out an AlarmUpdate to each alarm originator with the STATE_ALARM_GLOBAL_HUSH bit set for all the AlarmCondition. Each alarm originator acknowledges the message. The acknowledgement carries with it information whether the requested state was permitted or disallowed. If the state was disallowed, the acknowledgment includes an indication of a reason if given (e.g. disallowed by regulatory policy). If the remote hush request was accepted, the alarm originator increases the sequence number. Then, if permitted by policy, the originator changes the state of the alarm conditions asked in the request. If the alarm may not be hushed remotely, the originator sets the state to STATE_ALARM_REMOTE_HUSH. Each originator then proceeds to send out the Alarm message with the updated alarm state. Upon reception of the new alarm state from every alarm originator, remote alarms enter the hush state. If the global hush was permitted at each originator, every node in the network will play the message "Alarm hushed". If the alarm originators only permitted a remote hush, each originator will play its own alarm message along with its own location, and the nodes that did not originate an alarm will be hushed.

Multiple alarm originators, multiple alarm causes:
- Alarming: Each alarm originator sends out an alarm message, with the AlarmConditions set as needed. Each node in the network tracks all the known AlarmConditions from all originators. The alarm that is played consists of tuples of the form (Severity, AlarmCondition, list of locations where alarms are occurring) ordered by severity and AlarmCondition. The alarm sound played may be incomplete if it exceeds the maximum duration. In some embodiments, only the most severe alarm cause may be played. In some embodiments all alarms exceeding a predetermined severity may be played. Given the tight timing between the buzzer sounds, the embodiments may favor a brief messages, and play only the most severe alarm condition, and omitting the location of that condition if it occurs in more than a single place
- Local hush: on hush condition at the one the originators, the respective originator node sends out the alarm message with the STATE_ALARM_GLOBAL_HUSH bit set for all the AlarmConditions that it originated. Additionally, it sends AlarmUpdate requests to each of the other active originators, the requested state is STATE_ALARM_GLOBAL_HUSH. Each of the other originators acts independently on the reception of the AlarmUpdate message: each originator accepts or rejects the update (according to policy), updates its AlarmCtr, and sends out the new state. If permitted by policy, the receiving originator accepts the STATE_ALARM_GLOBAL_HUSH. If the policy does not permit global hush, the receiving originator sets its state to STATE_ALARM_REMOTE_HUSH, and continues to play its local alarm tone. When each remote alarm has received the updated state from each originator, the state of each alarm will be either STATE_ALARM_GLOBAL_HUSH or STATE_ALARM_REMOTE_HUSH. At that point, the remote alarms will play the message "Alarm hushed" and enter the hushed state. The alarm originators may continue to play their local alarm messages if they rejected the global hush request.

Remote hush: at the remote alarm, a hush state is initiated. The node sends out an AlarmUpdate to each alarm originator with the STATE_ALARM_GLOBAL_HUSH bit set for all the AlarmCondition. Each AlarmOriginator acknowledges the message. The acknowledgement carries with it information whether the requested state was permitted or disallowed. If the requested state was disallowed, an indication of a reason is given (e.g. disallowed by regulatory policy) in the acknowledgment. If the remote hush request was accepted, the alarm originator increases the sequence number. Then, if permitted by policy, it changes the state of the alarm conditions asked in the request. If the alarm may not be hushed remotely, the originator sets the state to STATE_ALARM_REMOTE_HUSH. Each originator then proceeds to send out the Alarm message with the updated alarm state. If the policy does not permit global hush, the receiving originator sets its state to STATE_ALARM_REMOTE_HUSH, and continues to play its local alarm tone. When each remote alarm has received the updated state from each originator, the state of each alarm will be wither STATE_ALARM_GLOBAL_HUSH or STATE_ALARM_REMOTE_HUSH. At that point, the remote alarms will play the message "Alarm hushed" and enter the hushed state. The alarm originators may continue to play their local alarm messages if they rejected the global hush request.

g. Broadcast Dissemination

A number of communication patterns—interconnected alarms, broadcast notifications—use a multicast primitive that operates over a multi-hop network. The broadcast primitive is used when the notion of group membership is ill-defined, changing, or unknown. In such situations, the communication pattern may be implemented in a way to not block group membership changes.

The broadcast primitive may be based around broadcasting a single message to the network and flooding that message throughout the network in a controlled manner. In some embodiments, the message may be sent to all nodes in a fabric. In other embodiments, a sending device (or user) may specify whether to send to all nodes or just nodes in a particular link. Moreover, in some embodiments, one or more devices on the network may forward messages to other sub-networks or networks. It may desirable to separate the forwarding and dissemination of the message from the processing and understanding of message payload. For example, a node may be able to forward a message without acting on the message, as this enables a much greater connectivity within the network. For simplicity, in some embodiments, each node may originate a single broadcast message active within the network.

i. Broadcast Dissemination Message Formatting

In some embodiments, the broadcast message may specify the following attributes:

The destination address maybe set to a site-local broadcast within one or more logical networks (e.g., WiFi, 802.15.4, etc.)

The S-flag in the Fabric message header may be set to 1 and the Source Node ID may be set to the originator of the message.

As in other Fabric messages, the MessageID may be used to identify the messages. Here, the MessageID may remain associated with the Source Node ID, even though the packet is being re-broadcast. In contrast to other fabric applications, the forwarding node may hold onto the MessageIDs for a period of time. Repeated receptions of the same message IDs are not necessarily an indication of a replay but rather an indication of a local network density.

The message is resent using the forwarder EUI-based IP address, such as an a ULA assigned to the destination link.

In some embodiments, the fabric layer may understand how long to hold onto the message and to retransmit that message. This resending periodicity could be a system-wide configuration parameter, could be set during the key rotation periods, or perhaps be embedded within the message itself; we note that there are two unused bits in the fabric message headers that could be used to indicate additional fields that associate the timer durations with the message. The timers could also be set based on the class of service depending on whether the latency is important in the particular application.

ii. Broadcast Dissemination Runtime

In the propagation of the message, each message may the following state associated with it:

A timer T that determines when to stop tracking the message.

A time constant $\tau$ that, in conjunction with T, determines how many retransmissions of the single message take place independently within the network.

A random timer t in the range $[0, \tau]$ that determines whether to forward the message.

A counter c that tracks how many retransmissions have been received.

An integer k that represents the threshold of retransmissions.

Upon receiving a new broadcast message, the node starts a new timer t. The counter c is reset to 0. The node increments the counter c every time it receives the message with the tuple (messageID and Sender ID). When the timer t expires, and the node has received c<=k messages, it forwards the message. If the c>k, the node waits until r time expires, and begins the process anew. The process repeats until either T time expires, or a new broadcast message from SourceNodeID is received.

In some embodiments, each node may transmit at most once per time $\tau$. Moreover, in some embodiments, each node may have a chance to perform T/$\tau$ retransmissions. Furthermore, in certain embodiments, the random selection oft spreads which of the nodes in the local broadcast performs the retransmission.

The messages propagate across the hops as a function of the time constant $\tau$. The fundamental tradeoff in gossip protocols is between the number of messages sent and the propagation latency of the new information. In some embodiments, $\tau$ may be dynamically adjusted during the execution of the algorithm between $\tau 0$ and $\tau$max. For example, $\tau$ may be set to a short $\tau 0$ with each time the $\tau$ time elapses, $\tau$ may be doubled up to the value of $\tau$max.

To sum up, the algorithm may perform the following actions illustrated in Table 29 below:

TABLE 29

Algorithm actions

| Event | Action |
|---|---|
| T expires | Terminate the algorithm |
| τ expires | Double τ up to the maximum value of τmax, pick a new timer t |
| t expires | if c < k, retransmit the message increment c |
| Receive a duplicate of a message | increment c |
| Receive a newer message | set τ to τ0, reset c, pick a new timer t |
| Receive an older message | set τ to τ0, reset c, pick a new timer t |

In some particular embodiments, the algorithms for waking up devices on a fabric and disseminating messages to those devices as described in U.S. patent application Ser. No. 14/478,346, filed Sep. 5, 2014, and U.S. patent application Ser. No. 14/478,265, filed Sep. 5, 2014, both of which are incorporated by reference in their entirety for all purposes, may be implemented.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method for transferring alarm information between devices in a mesh network, comprising:
sending an alarm message containing information about an alarm, wherein the alarm message comprises:
an alarm counter indicator that includes a value that is configured to be changed to indicate that an alarm status has changed from a previous alarm message;
one or more indications of alarm conditions indicating an alarm state or an alarm source; and
an alarm length that indicates a number of alarm conditions included in the alarm message; and
hushing the alarm using an alarm status update message, wherein hushing the alarm comprises:
allowing a first remote device or a first remote device type to hush the alarm through a remote connection via a first alarm status update message; and
blocking a second remote device or a second remote device type from hushing the alarm through the remote connection via a second alarm status update message, wherein each alarm status update message comprises:
an alarm update counter indicator that matches to the alarm counter indicator of the alarm message corresponding to the alarm to which the alarm status update is updating; and
one or more update indications of alarm conditions being updated.

2. The method of claim 1, comprising:
propagating the alarm to one or more devices in a fabric, wherein propagating the alarm within the fabric comprises sending the alarm message to a first device type without sending the alarm message to a second device type.

3. The method of claim 1, wherein the message comprises an originating node identifier that identifies an originating device within a fabric or network that originated the alarm, wherein the originating node identifier comprises a 64-bit Internet Protocol (IP) unique identifier used to identify the originating device to a specific device within a specific fabric or network.

4. The method of claim 1, wherein the message comprises an extended location identifier for an originating device within a fabric or network that originated the alarm, wherein the extended location identifier comprises an 128-bit identifier of the originating device as a specific device within a specific fabric and a specific network.

5. The method of claim 1, wherein the value comprises an 8-bit value that indicates an alarm version for the alarm message indicating whether the alarm state has been updated, wherein the alarm counter indicator starts at an initial value and, the alarm counter indicator is incremented each time the alarm status is updated.

6. The method of claim 5, comprising:
resolving the alarm that corresponds to the alarm message; and
in response to resolving the alarm, resetting the alarm counter indicator to the initial once the alarm has been resolved, wherein the initial value indicates that no current alarm exists or the alarm has been resolved.

7. A non-transitory, computer-readable medium having stored thereon instructions that, when executed, are configured to cause a processor to:
send an alarm message containing information about an alarm, wherein the alarm message comprises:
an alarm counter indicator that includes a value that is configured to be changed to indicate that an alarm status has changed from a previous alarm message;
one or more indications of alarm conditions indicating an alarm state or an alarm source; and
an alarm length that indicates a number of alarm conditions included in the alarm message; and
hush the alarm using an alarm status update message, wherein hushing the alarm comprises:
allow a first remote device or a first remote device type to hush the alarm through a remote connection via a first alarm status update message; and
block a second remote device or a second remote device type from hushing the alarm through the remote connection via a second alarm status update message, wherein each alarm status update message comprises:
an alarm update counter indicator that matches to the alarm counter indicator of the alarm message corresponding to the alarm to which the alarm status update is updating; and
one or more update indications of alarm conditions being updated.

8. The non-transitory, computer-readable medium of claim 7, wherein the alarm source indicates a sensor type from which the alarm originated, wherein the sensor type comprises a smoke sensor, a temperature sensor, a carbon monoxide sensor, a natural gas sensor, a humidity sensor, and a security alarm.

9. The non-transitory, computer-readable medium of claim 8, wherein sending the alarm message comprises resending the alarm message periodically while the alarm has not been resolved and a threshold duration for alarm resending has not been surpassed.

10. The non-transitory, computer-readable medium of claim 8, wherein when the alarm source is null or not explicitly listed in the an alarm condition of the one or more alarm conditions, the alarm state for the alarm condition comprises a standby state for the alarm that indicates that a current alarm is not active.

11. The non-transitory, computer-readable medium of claim 8, wherein when the one or more indications of alarm conditions comprise an implicit indication of alarm condition when explicit indications of alarm conditions are missing from the alarm message when the alarm length is set, wherein an implicit indication of alarm conditions indicate that the alarm message comprises an all clear signal.

12. The non-transitory, computer-readable medium of claim 7, wherein sending the alarm message comprises:
sending the alarm message as a multicast message that is to be propagated to neighboring devices to which communication may be established; or
sending the alarm message as a unicast message that is addressed to one or more destination devices.

13. An electronic device, comprising:
a network interface;
memory; and
a processor configured to:
send an alarm message containing information about an alarm, wherein the alarm message comprises:
an alarm counter indicator includes a value that is configured to be changed to indicate that an alarm status has changed from a previous alarm message;
one or more indications of alarm conditions indicating an alarm state or an alarm source; and
an alarm length that indicates a number of alarm conditions included in the alarm message; and
hush the alarm using an alarm status update message, wherein hushing the alarm comprises:
allow a first remote device or a first remote device type to hush the alarm through a remote connection via a first alarm status update message; and
block a second remote device or a second remote device type from hushing the alarm through the remote connection via a second alarm status update message, wherein each alarm status update message comprises:
an alarm update counter indicator that matches to the alarm counter indicator of the alarm message corresponding to the alarm to which the alarm status update is updating; and
one or more update indications of alarm conditions being updated.

14. The electronic device of claim 13, wherein the processor is configured to receive, via the network interface from another device, an incoming alarm message that comprises:
an incoming alarm counter indicator that corresponds to the alarm counter indicator;
one or more indications of incoming alarm conditions corresponding to the one or more indications of alarm conditions; and
an incoming alarm length that corresponds to the alarm length.

15. The electronic device of claim 14, wherein the processor is configured to propagate the incoming alarm message as the sent alarm message, wherein the processor is configured to wait to send the alarm message until a timer has elapsed that manages how quickly message should be propagated through the network.

16. The electronic device of claim 14, wherein the processor is configured to rebroadcast the alarm message after a rebroadcast timer has elapsed, and wherein the processor is configured to limit a number of rebroadcasts to based on device rebroadcast limit value for the electronic device, based on a fabric rebroadcast limit value for a fabric on which the electronic device resides, or based on a network rebroadcast limit value for a network on which the electronic device resides.

17. The electronic device of claim 13, comprising one or more sensors configured to measure conditions around the electronic device, wherein when a condition of the conditions exceeds a threshold value, the processor is configured to include an indication for the condition in the one or more indications of alarm conditions to alarm other devices in the network about the status of the condition.

18. The electronic device of claim 13, wherein the alarm counter indicator is configured to be incremented when a new alarm state occurs and decremented when a current alarm state has been resolved.

* * * * *